(12) United States Patent
Zylberberg et al.

(10) Patent No.: US 12,539,420 B2
(45) Date of Patent: Feb. 3, 2026

(54) DEEP BRAIN STIMULATION USING ARTIFICIAL NEURAL NETWORKS

(71) Applicant: The Regents of the University of Colorado, a body corporate, Denver, CO (US)

(72) Inventors: Joel Zylberberg, Toronto (CA); Elijah Christensen, Denver, CO (US); John Thompson, Westminster, CO (US); Aviva Abosch, Omaha, NE (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 923 days.

(21) Appl. No.: 17/292,634

(22) PCT Filed: Nov. 12, 2019

(86) PCT No.: PCT/US2019/060956
§ 371 (c)(1),
(2) Date: May 10, 2021

(87) PCT Pub. No.: WO2020/097618
PCT Pub. Date: May 14, 2020

(65) Prior Publication Data
US 2022/0001181 A1 Jan. 6, 2022

Related U.S. Application Data

(60) Provisional application No. 62/758,484, filed on Nov. 9, 2018.

(51) Int. Cl.
*A61N 1/36* (2006.01)
*A61N 1/05* (2006.01)
*A61N 1/378* (2006.01)

(52) U.S. Cl.
CPC ....... *A61N 1/36078* (2013.01); *A61N 1/0534* (2013.01); *A61N 1/36082* (2013.01); *A61N 1/36139* (2013.01); *A61N 1/378* (2013.01)

(58) Field of Classification Search
CPC .............. A61N 1/36078; A61N 1/0534; A61N 1/36082; A61N 1/36139; A61N 1/378;
(Continued)

(56) References Cited

U.S. PATENT DOCUMENTS 8,073,534 B2   12/2011   Low
9,211,417 B2   12/2015   Heldman et al.
(Continued)

FOREIGN PATENT DOCUMENTS

WO   WO-2014118693 A1 * 8/2014 .............. A61B 5/01
WO   2017/136352 A1   8/2017

OTHER PUBLICATIONS

Hu, F., & Hao, Q. (Eds.). (2013). Intelligent Sensor Networks: The Integration of Sensor Networks, Signal Processing and Machine Learning. CRC Press. https://doi.org/10.1201/b14300 (Year: 2013).*
(Continued)

*Primary Examiner* — Benjamin J Klein
*Assistant Examiner* — Daniel Tehrani

(57) ABSTRACT

Various embodiments of the present technology generally relate to closed loop deep brain stimulation based on inferred sleep stage from physiological data using machine learning classifiers. Some embodiments, for example, may use subthalamic nucleus (STN) deep brain stimulation (DBS) to treat advanced Parkinson's Disease motor symptoms and improve sleep by identifying sleep stages commensurate with clinician-scored polysomnography (PSG). The DBS may be adapted to include a novel artificial neural network (ANN) that triggers targeted stimulation in response to inferred sleep state from STN local field poten-
(Continued)

tials (LFPs) recorded from implanted DBS electrodes. A feedforward neural network can be trained to prospectively identify sleep stage with PSG-level accuracy. In some embodiments, the machine learning model stored within the DBS may also adapt stimulation during specific sleep stages to treat targeted sleep deficits.

19 Claims, 20 Drawing Sheets

(58) Field of Classification Search
CPC ............ A61N 1/36064; A61N 1/36067; A61N 1/36135; A61N 1/3605; A61N 1/36185; A61N 1/36025; A61N 1/36146; A61N 1/0531; A61N 1/36096; A61B 5/4836; A61B 5/4064; A61B 5/6868; A61B 5/4812
See application file for complete search history.

(56) References Cited

U.S. PATENT DOCUMENTS

| | | | |
|---|---|---|---|
| 9,238,142 | B2 | 1/2016 | Heldman et al. |
| 9,326,724 | B2 | 5/2016 | Sun et al. |
| 9,522,278 | B1 | 12/2016 | Heldman et al. |
| 9,717,920 | B1 | 8/2017 | Heldman et al. |
| 2006/0212090 | A1 | 9/2006 | Lozano et al. |
| 2010/0217147 | A1* | 8/2010 | Odame ................. A61B 5/369 600/544 |
| 2010/0280579 | A1 | 11/2010 | Denison et al. |
| 2011/0112590 | A1 | 5/2011 | Wu et al. |
| 2012/0016435 | A1 | 1/2012 | Rom |
| 2013/0123684 | A1* | 5/2013 | Giuffrida ............. A61B 5/7405 607/45 |
| 2014/0297600 | A1 | 10/2014 | Kan et al. |
| 2015/0012057 | A1 | 1/2015 | Carlson et al. |
| 2015/0290454 | A1 | 10/2015 | Tyler et al. |
| 2015/0306391 | A1* | 10/2015 | Wu .................... A61N 1/36078 607/45 |
| 2017/0113046 | A1 | 4/2017 | Fried et al. |
| 2017/0251985 | A1 | 9/2017 | Howard |
| 2018/0064388 | A1 | 3/2018 | Heneghan et al. |
| 2018/0271435 | A1 | 9/2018 | Zhao et al. |

OTHER PUBLICATIONS

Mahanta, J. (2017) Introduction to neural networks, advantages and applications, Medium. Available at: https://towardsdatascience.com/introduction-to-neural-networks-advantages-and-applications-96851bd1a207 (Year: 2017).*
Mansar, Y. (2018) Sleep stage classification from single channel EEG using Convolutional Neural Networks, Medium. Available at: https://towardsdatascience.com/sleep-stage-classification-from-single-channel-eeg-using-convolutional-neural-networks-5c710d92d38e. (Year: 2018).*
Vadali, S. (2017) Day 8: Data transformation—skewness, normalization and much more, Medium. Available at: https://medium.com/@TheDataGyan/day-8-data-transformation-skewness-normalization-and-much-more-4c144d370e55. (Year: 2017).*
Thompson, J. A., Tekriwal, A., Felsen, G., Ozturk, M., Telkes, I., Wu, J., . . . & Abosch, A. (Sep. 2, 2017). Sleep patterns in Parkinson's disease: direct recordings from the subthalamic nucleus. J Neurol Neurosurg Psychiatry 2017;0:1-11 (Year: 2017).*
Abbott, Press Release for "Abbott Expands Its Directional Deep Brain Stimulation Therapy By Offering New MR-Conditional Labeling," 5 pages, Aug. 2, 2018.
Carlson, Joe, "Abbott's Infinity Deep Brain Stimulation System Is Rare Technology Advance," Star Tribune, 2 pages, May 6, 2017.
Chaturvedi, Ashutosh et al., "Artificial Neural Network Based Characterization Of The Volume Of Tissue Activated During Deep Brain Stimulation," J Neural Eng., vol. 10, No. 5, 17 pages, Oct. 2013.
Grill, Warren, "Brain Stimulation An Option For Epilepsy Market," NeuroTech, 2 pages, Aug. 28, 2017.
Little, Simon et al., "Adaptive Deep Brain Stimulation In Advanced Parkinson Disease," Annals of Neurology, vol. 74, No. 3, pp. 449-457, Sep. 2013.
Mayo Clinic, "Deep Brain Stimulation," https://web.archive.org/web/20190824161009/https://www.mayoclinic.org/tests-procedures/deep-brain-stimulation/about/pac-20384562, 8 pages, Aug. 24, 2019.
Medtronic, "Deep Brain Stimulation Systems," https://web.archive.org/web/20181101151202/http://www.medtronic.com/US-EN/healthcare-professionals/products/neurological/deep-brain-stimulation-systems.html, 3 pages, Nov. 1, 2018.
Melinosky, Christopher, "Deep Brain Stimulation For Parkinson's Disease," WebMD, LLC, 3 pages, Aug. 26, 2019.
Modolo, J. et al., Abstract for "Linking Brain Dynamics, Neural Mechanisms, And Deep Brain Stimulation In Parkinson's Disease: An Integrated Perspective," Medical Engineering & Physics, vol. 31, No. 6, pp. 615-623, Feb. 24, 2009.
NeuroPace, Inc., "NeuroPace RNS System," https://web.archive.org/web/20191110225701/https://www.neuropace.com/the-ms-system/#how-it-works, 9 pages, Nov. 10, 2019.
Sharma, Vibhash D. et al., "Deep Brain Stimulation And Sleep-Wake Disturbances In Parkinson Disease: A Review," Frontiers in Neurology, vol. 9, Article 697, pp. 1-9, Aug. 27, 2018.
Tekriwal, Anand et al., "REM Sleep Behaviour Disorder: Prodromal And Mechanistic Insights For Parkinson's Disease," J. Neurol Neurosurg Psychiatry, vol. 88, pp. 445-451, 2017.
Thompson, John A. et al., Abstract for "Sleep Patterns In Parkinson's Disease: Direct Recordings From The Subthalamic Nucleus," J Neurol Neurosurg Psychiatry, vol. 1, pp. 95-104, Jan. 2018.
International Application No. PCT/US2019/060956, International Search Report & Written Opinion, 12 pages, Jan. 24, 2020.

* cited by examiner

PD subject demographics (n = 9)

| | Age (y) | PD Dur. (y) | % Improv. | 30 second sleep epochs (#) | | | | | |
|---|---|---|---|---|---|---|---|---|---|
| | | | | Total | Awake | REM | N1 | N2 | N3 |
| mean | 60.11 | 10.67 | 61.89 | 837.11 | 377.89 | 62.29 | 134.78 | 186.00 | 88.40 |
| median | 61.00 | 9.50 | 61.00 | 791.00 | 282.00 | 73.00 | 106.00 | 221.00 | 10.00 |
| std | 9.56 | 4.63 | 11.40 | 165.67 | 246.58 | 45.61 | 94.79 | 122.20 | 112.90 |
| min | 39 | 6 | 47 | 676 | 97 | 11 | 33 | 3 | 4 |
| max | 70 | 19 | 79 | 1149 | 850 | 133 | 284 | 322 | 239 |
| range | 31 | 13 | 32 | 473 | 753 | 122 | 251 | 319 | 235 |

FIG. 8A

DEEP BRAIN STIMULATION USING ARTIFICIAL NEURAL NETWORKS

CROSS-REFERENCE TO RELATED APPLICATIONS

This application is a national stage of International Application No. PCT/US2019/060956 filed Nov. 12, 2019, which claims priority to U.S. Provisional Application Ser. No. 62/758,484 filed Nov. 9, 2018, each of which is incorporated herein by reference in its entirety for all purposes.

TECHNICAL FIELD

Various embodiments of the present technology generally relate to deep brain stimulation. More specifically, some embodiments of the present technology relate to closed loop deep brain stimulation based on inferred sleep stage from local field potentials using artificial neural networks.

BACKGROUND

Deep brain stimulation (DBS) is used to provide electrical impulses, via implanted electrodes, within the brain of a patient. The electrical impulses created by the deep brain stimulation system may be used to treat various neurological conditions (e.g., Parkinson's disease, epilepsy, Tourette's syndrome, etc.) by affecting chemicals and cells within the brain. For example, DBS can be used to treat the motor symptoms of Parkinson's disease. In this treatment, electrodes are implanted in the subthalamic nucleus, and current pulses are applied to the patient's brain.

Traditional DBS methods are open loop and non-adaptive. As such, these traditional systems and techniques provide the same stimulation regardless of what the patient is doing (e.g., sitting, walking, asleep, awake, etc.). This is also very energy inefficient because when the patient is asleep, the patient does not need the stimulator to be on and yet the stimulator still provides current into the patient's brain. This means that the battery will deplete quicker. Moreover, a surgery is needed to replace the battery.

SUMMARY

Parkinson's disease (PD) is highly comorbid with sleep dysfunction. In contrast to motor symptoms, few therapeutic interventions exist to address sleep symptoms in PD. Subthalamic nucleus (STN) deep brain stimulation (DBS) treats advanced PD motor symptoms and may improve sleep architecture. Various embodiments of the present technology use STN-DBS to adaptively modulate sleep. Some embodiments include a novel artificial neural network (ANN) that could trigger targeted stimulation in response to inferred sleep state from STN local field potentials (LFP) recorded from implanted DBS electrodes.

Embodiments of the present technology also include computer-readable storage media containing sets of instructions to cause one or more processors to perform the methods, variations of the methods, and other operations described herein.

While multiple embodiments are disclosed, still other embodiments of the present technology will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

FIGS. 8A-8C illustrate examples of clinical data collected in accordance with some embodiments of the present technology.

Figure 1:
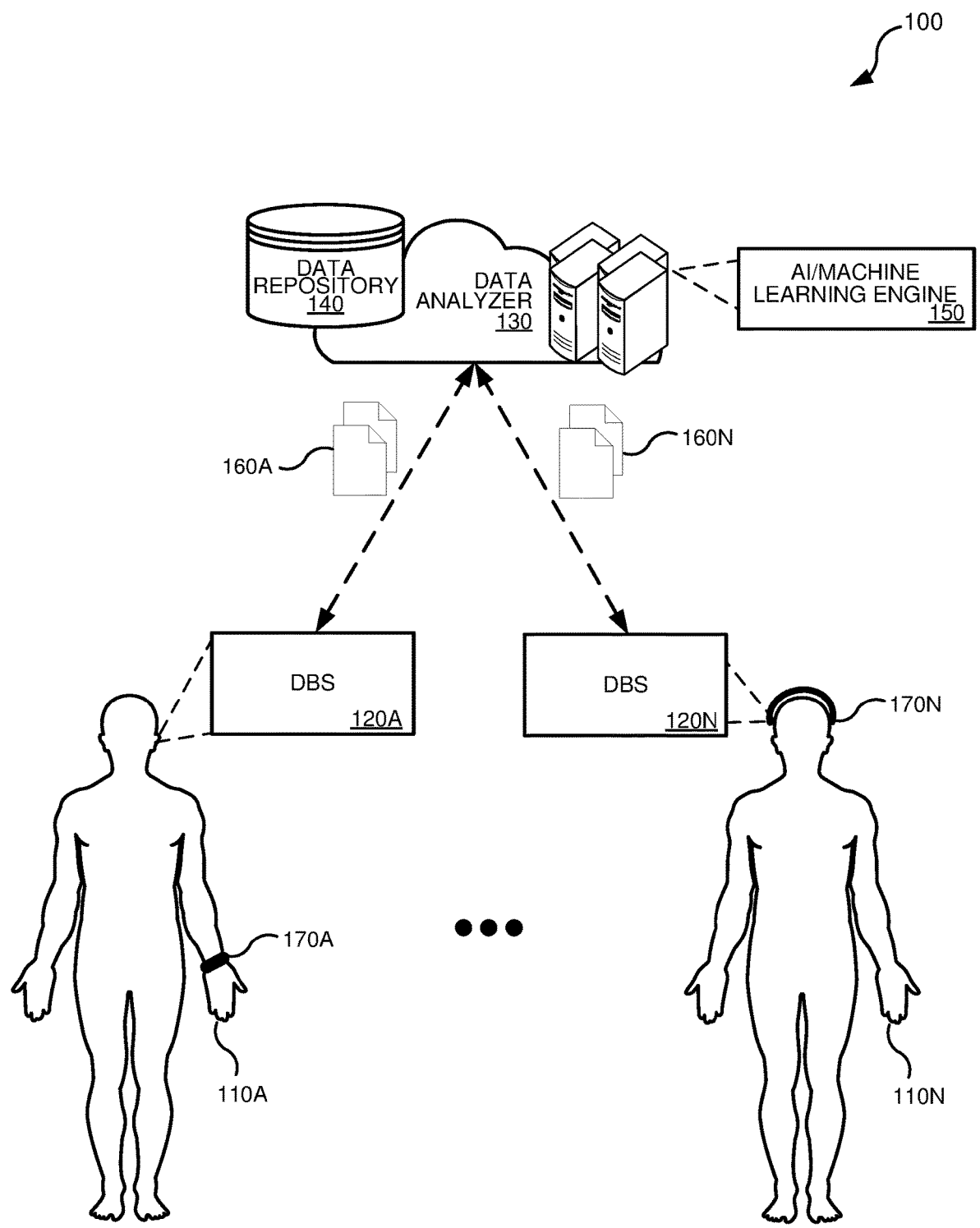
FIG. 1 illustrates an example of various components that may be used to train deep brain stimulation (DBS) systems in accordance with some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to deep brain stimulation. More specifically, some embodiments of the present technology relate closed loop deep brain stimulation based on inferred sleep stage from local field potentials using artificial neural networks. Traditional deep brain stimulation is open loop and non-adaptive. This means that the same electrical impulses are generated (e.g., on a specific schedule) all the time regardless of patient activity or need. Such configurations are very energy inefficient because when the patient is asleep, the patient does not need the stimulator to be on and yet the stimulator still provides current into the patient's brain. This means that the battery packs will be depleted quickly which must be replaced by surgery.

Moreover, sleep is crucial to the regulation of physiological and cognitive functions in humans, and when disordered, greatly diminishes quality of life and adversely affects nervous system repair. Parkinson's disease (PD) is a neurodegenerative disorder that exhibits a high degree of comorbidity with a wide range of sleep disorders. The diagnosis and treatment of PD primarily focus on the overt motor symptoms. However, there is increasing interest in understanding the impact of non-motor symptoms, such as sleep dysfunction, on overall disease burden, and in identifying treatments for these symptoms.

With the onset of motor fluctuations or break-through tremor despite optimal medical management, subthalamic nucleus (STN) deep brain stimulation (DBS) surgery has become the gold-standard for treating the motor symptoms of advanced PD. Interestingly, several studies have found that STN-DBS can improve sleep in PD. Local field potentials (LFP) recorded from DBS electrodes implanted in STN for the treatment of PD can be recorded. The unique spectral patterns within STN oscillatory activity can be identified and correlated with distinct sleep cycles—a finding that might offer insight into sleep dysregulation. In accordance with some embodiments, LFP information recorded from STN could be used in real-time to objectively identify sleep cycles for targeted therapy using DBS. In other words, the sleep benefit derived from STN stimulation could potentially be optimized by the use of an adaptive stimulation algorithm that is aimed at specific sleep stages. Various embodiments demonstrate the use of feedforward artificial neural network that predicts sleep cycle from LFP recordings, within the STN, with high precision.

Some embodiments provide for closed loop stimulators that adapt themselves in real-time based on measurements from the brain (and/or other physiological measurements). Some embodiments have the capability to read brain signals (e.g., local field potentials) which can be used to provide customized brain stimulation. For example, a controller can take in the signals recorded from the patient's brain and change the stimulation in real-time based on the state of the brain (e.g., awake, in REM sleep, in non-REM sleep, etc.).

Some embodiments of the present technology use a source of clinical data collected from patients performing various activities (e.g., sleeping). This data can be labeled, normalized, and used to train one or more global controllers or models used to operate an implanted deep brain stimulation system across a wide variety of individual patients. Some embodiments use artificial neural networks (ANNs) to generalize the controller or model between patients. Some embodiments normalize the data before ANN ingestion for training and/or classification. This normalization allows the model to provide valuable and useful results across large (if not entire) populations. In accordance with various embodiments, the model can be compiled in a firmware update and loaded onto the DBS systems implanted in the patients. As a result, the DBS systems can monitor specific physiological systems and create target DBS stimulation (e.g., based on sleep state, whether a patient is sitting still or moving, etc.). In some embodiments, the inputs to the ANN may be from multiple time points. Instead of looking at just the current time point to identify the current sleep state, the neural network can use current and previous time points to identify the current sleep state. The addition of data from the previous time points can improve the sleep state identification in some cases.

Wearable devices, home EEG monitoring systems, or other data collection systems can be used to provide local updates to the controller or model in some embodiments. For example, data collections systems can collect data which can be labeled and analyzed to identify sleep state. This data can be sent back to an analysis platform, in some embodiments, to provide more training data which can be used to improve the individual's model (e.g., by providing a customized model) and/or used to create improved global models that can be distributed to multiple users of the deep brain stimulation systems.

Various embodiments of the present technology provide for a wide range of technical effects, advantages, and/or improvements to deep brain stimulation systems and components. For example, various embodiments include one or more of the following technical effects, advantages, and/or improvements: 1) a global model for classification of brain signals that can be used across multiple patients thereby preventing the need to create a customized model for every patient; 2) integrated use of classifiers (e.g., artificial neural networks) to create a global classifier; 3) proactive and gradual training at a local, device level to provide improved performance of the deep brain stimulation; 4) use of unconventional and non-routine computer operations to classify sleep states of a user which can be used to adjust deep brain stimulation; 5) closed loop deep brain stimulation based on physiological measurements (e.g., local field potentials) to create electrical impulses within the patient's brain; 6) use of closed-loop control systems for deep brain stimulation to extend battery life by shutting itself off when the patient is asleep; 7) customized deep brain stimulation therapy based on whether the patient is at rest or moving; 8) adaptation of different stimulation therapies based on patient states (e.g., movement versus non-movement patterns, awake versus sleeping, etc.); 9) integration of a real-closed loop system within the deep brain stimulation system that provides finer adjustments to push the patient back to deeper, more restful sleep; and/or 10) targeted stimulation of a patient in a specific sleep state to improve sleep transitions (e.g., to invoke REM sleep).

In the following description, for the purposes of explanation, numerous specific details are set forth in order to provide a thorough understanding of embodiments of the present technology. It will be apparent, however, to one skilled in the art that embodiments of the present technology may be practiced without some of these specific details. Moreover, while various embodiments are described with respect to the indication of disruptive sleep in Parkinson's disease, the technology can be used to treat disruptive sleep in other indications.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of various components that may be used to train deep brain stimulation (DBS) systems in accordance with some embodiments of the present technology. As illustrated in FIG. 1, environment 100 may include multiple users 110A-110N with DBS systems 120A-120N, data analyzer service 130, data repository 140, artificial intelligence/machine learning engine 150, and external monitors 160A-160N (e.g., wearable, home EEG monitor, etc.). DBS systems 120A-120N can be programmed with a controller or model developed from a large amount of data stored in data repository 140 and analyzed by artificial intelligence/machine learning engine 150.

In addition, external monitors 160A-160N may include network communication components that enable external monitors 160A-160N to communicate with the DBS systems 120A-120N and/or remote servers associated with data analyzer service 130, or other portable electronic devices (e.g., smart phones, computers, tablets, etc.) by transmitting and receiving wireless signals using licensed, semi-licensed or unlicensed spectrum over a communications network. In some cases, the communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network can also include third-party communications networks such as a Global System for Mobile (GSM) mobile communications network, a code/time division multiple access (CDMA/TDMA) mobile communications network, a $3^{rd}$, $4^{th}$, or 5th generation (3G/4G/5G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

In accordance with various embodiments DBS systems 120A-120N can include one or more classifiers to identify physiological states of the patient. These classifiers can be an artificial neural network (e.g., to classify one or more physiological states of the patient without human intervention), for example. Once the neural network is trained with the training data stored in data repository 140, updates 160A-160N can be installed on DBS systems 120A-120N. The installation of updates 160A-160N may be installed in a variety of ways. For example, in some embodiments the updates can be transmitted to a computer at a physician's office and then installed on the DBS systems. As another example, the updates 160A-160N can be installed directly at the factory before being shipped to the patient. In some embodiments, the neural network can include a variety of weights that can be set to minimize the error between the inputs of the training data and the labeled state.

Some embodiments of the present technology use a source of clinical data collected from patients performing various activities (e.g., sleeping). This data can be stored in data repository 140. In addition, the data may be preprocessed by data analyzer 130 to provide an expected format, remove outliers, add labels, normalized, and/or other desired preprocessing operations. Some embodiments normalize the data before ANN ingestion for training and/or classification. This can be done in a variety of ways. Some embodiments, for example, may identify the absolute peak magnitude of the power of the data (e.g., the local field potential measurements) and divide the entire data by the peak magnitude to create a normalized signal. This normalization allows the artificial intelligence and machine learning engine 150 to generate a model that provides valuable and useful results across large (if not entire) populations.

The artificial intelligence and machine learning engine 150 can use the data to train one or more global controllers or models used in a classifier within DBS systems across a wide variety of individual patients 110A-110N. Some embodiments use artificial neural networks (ANNs) to generalize the controller or model between patients. As such, the DBS systems 120A-120N do not have to be individually trained. In accordance with various embodiments, the model can be compiled in a firmware update and loaded onto the DBS systems implanted in the patients. As a result, the DBS systems can monitor specific physiological systems and create target DBS stimulation (e.g., based on sleep state, whether a patient is sitting still or moving, etc.).

Once the DBS systems 120A-120N are installed, the neural network can ingest the measured physiological data (e.g., local field potentials) and use that data to classify or identify a physiological state of the patient. The physiological state identified by the neural network (or other classifier such as, but not limited to, linear classifier, nearest neighbor, support vector machine, decision tree, deep learning, or the like) can be used to determine a set of electrical impulses to be delivered by DBS systems 120A-120N.

In accordance with various embodiments, external monitors 160A-160N (e.g., wearable devices, home EEG monitoring systems, or other data collection systems) can be used to provide additional local training data. For example, a wearable may monitor movement during sleep and identify a sleep state (e.g., rapid eye movement (REM) or the non-REM (NREM) stages of N1, N2 or N3). This additional data can be processed and used to provide local updates to the controller or model in some embodiments. In some embodiments, this data can be sent back to an analysis platform to provide more training data which can be used to improve the individual's model (e.g., by providing a customized model) and/or used to create improved global models that can be distributed to multiple users of the deep brain stimulation systems.

Figure 2A:
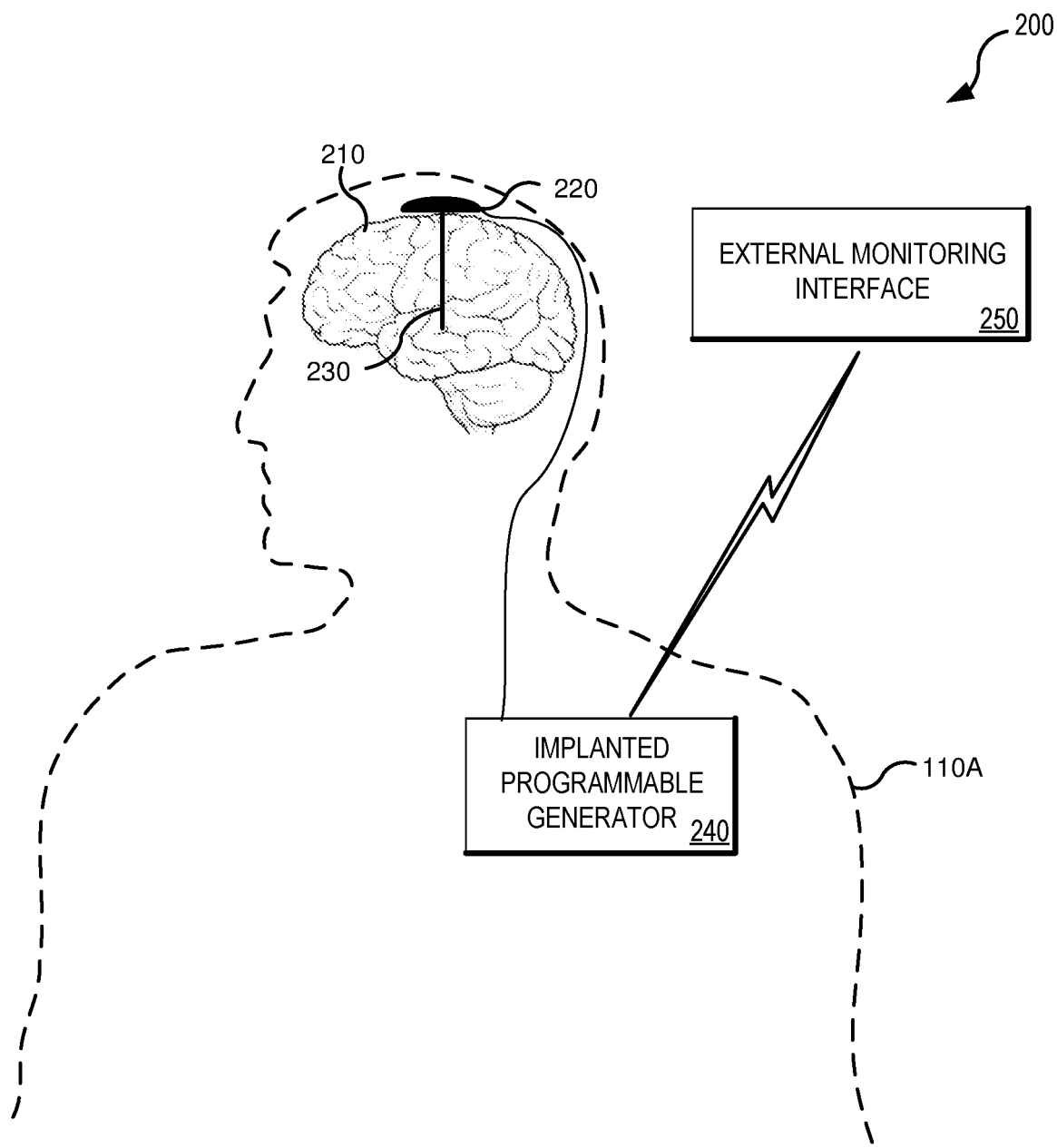
FIG. 2A illustrates a set of components of a DBS system according to one or more embodiments of the present technology.

FIG. 2A illustrates a set of components of a DBS system 200 according to one or more embodiments of the present technology. As illustrated in FIG. 2A, patient 110A has a DBS system 200 installed to deliver therapy to a targeted portion of brain 210. DBS system 200 can include an implanted quadripolar electrode array 220 with one or more leads 230 (e.g., insulated wires) inserted into specific sections (e.g., subthalamic nucleus) of brain 210. Electrode array 220 can be communicably coupled (e.g., via a wire) to implanted programmable generator 240 (e.g., a pulse generator). Programmable generator 240 can be placed under the skin of the chest or in the abdomen of patient 110A.

Figure 2B:
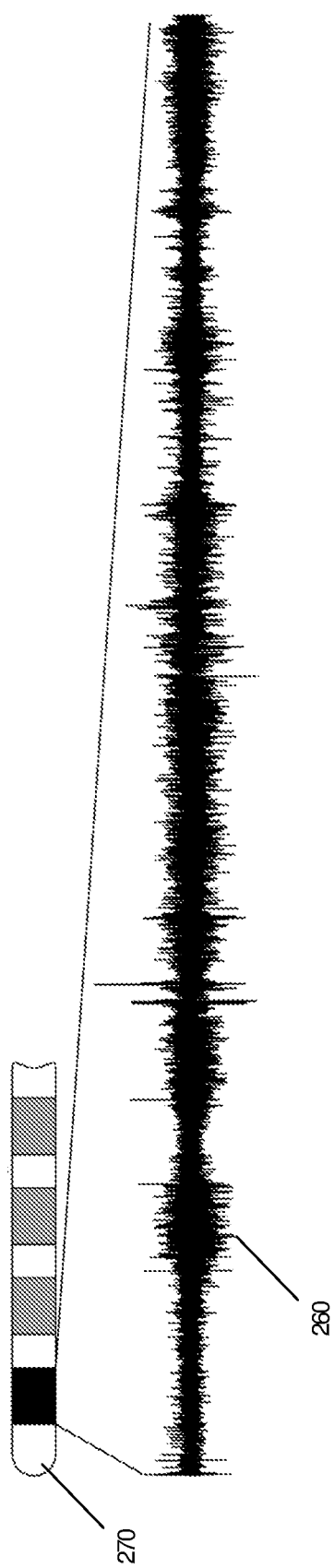
FIG. 2B illustrates an example of plot of the raw STN-LFP recording from a DBS electrode in accordance with various embodiments of the present technology.
Figure 2C:
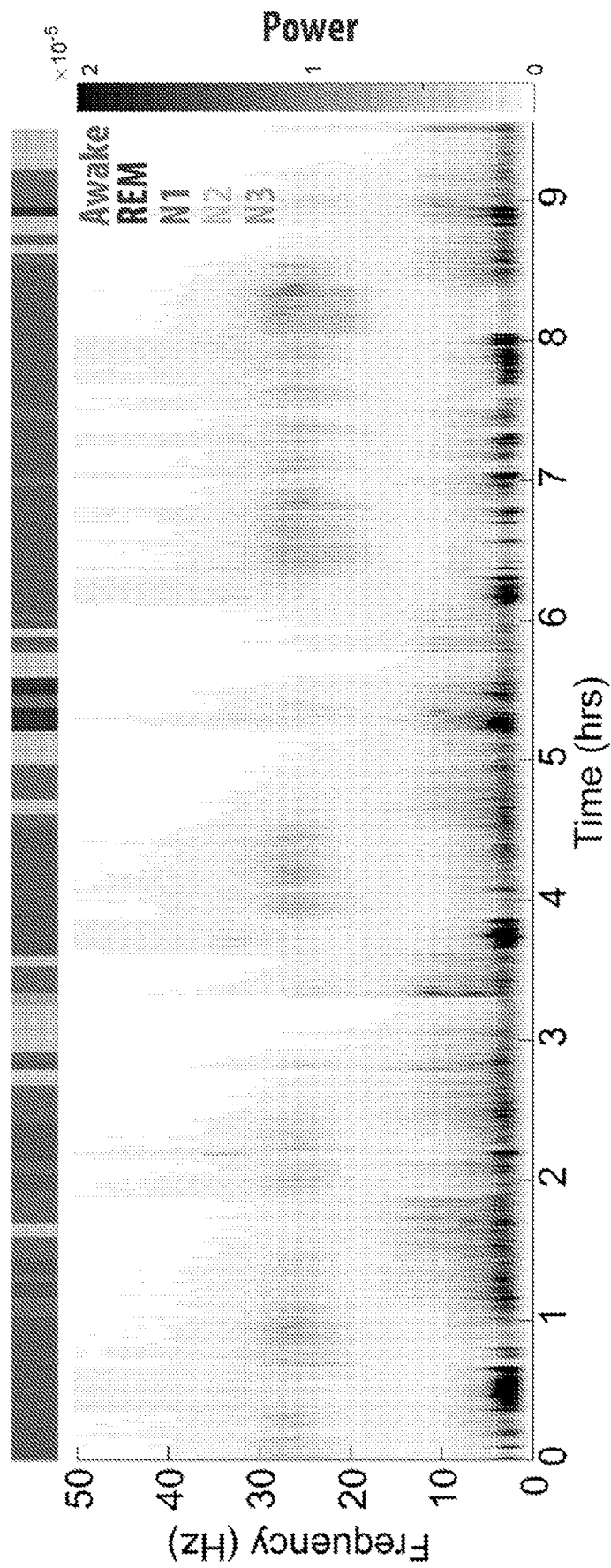
FIG. 2C illustrates an example of a plot of a STN-LFP spectrogram-hypnogram according to some embodiments of the present technology.
Figure 2D:
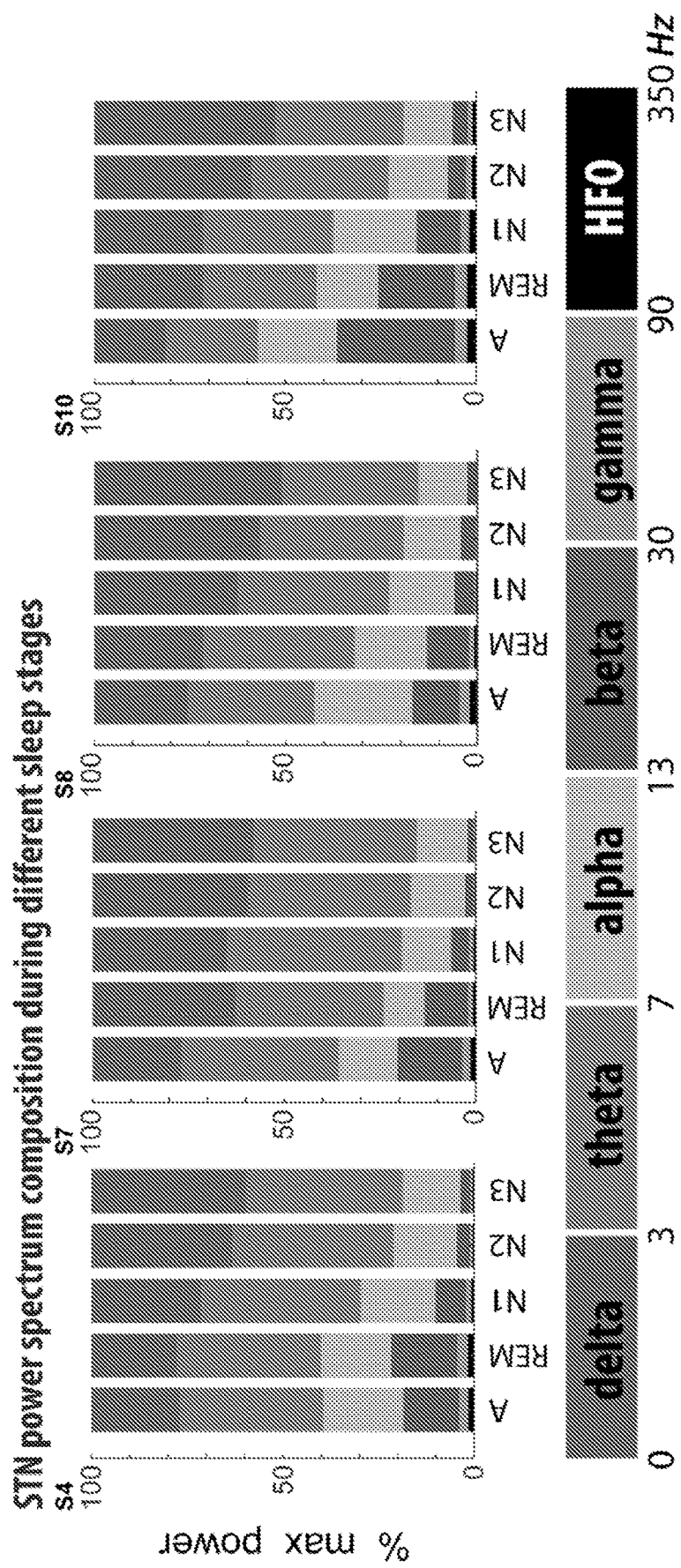
FIG. 2D illustrates plots of the STN power spectrum composition during different sleep stages of signals that may be collected by the DBS system in some embodiments of the present technology.

In some embodiments, DBS system 200 may include multiple channels (e.g., a dual channel device) and may allow for multiple electrical contacts (e.g., four electrical contacts which are each a few $mm^2$). FIG. 2B illustrates an example of plot of the raw STN-LFP recording 260 from a DBS electrode 270 in accordance with various embodiments of the present technology. FIG. 2C illustrates an example of a plot of a STN-LFP spectrogram-hypnogram according to some embodiments of the present technology. FIG. 2D illustrates plots of the STN power spectrum composition during different sleep stages of signals that may be collected by the DBS system in some embodiments of the present technology.

In accordance with various embodiments, the implanted programmable generator 240 may include one or more of the following components to generate mild electrical impulses to precisely stimulate the targeted regions of the brain: 1) one or more micro-processors; 2) a neural interface management system; 3) physiological sensing circuitry or module; and/or 4) physiological stimulation circuitry or module. In accordance with various embodiments, programmable generator 240 can dynamically update and deliver optimal treatment plans based on current and/or historical physiological data collected from patient 110A.

In some embodiments, stimulation may be provided using 100 Hz square waves, with the amplitude of stimulation, and the chosen electrical contact, being the tunable settings. The amplitude of the stimulation may be automatically adjusted using a neural network controller. As an example, in some embodiments, the voltage may be adjusted from 0-10.5 V or the current may be adjusted from 0-25.5 mA. Similarly, while the stimulation may be provided using 100 Hz square wave in some embodiments, other embodiments may allow for other frequencies (e.g., between 2 and 250 Hz) or pulse shapes.

The DBS system illustrated in FIG. 2A, can be used to treat the motor symptoms of various neurological diseases (e.g., Parkinson's diseases). In these treatments, electrodes 230 can be implanted in the subthalamic nucleus, and current pulses can be applied to the brain. Various embodiments have the ability to both record brain state (e.g., local field potentials, or LFPs), and to stimulate brain 210. Using the measurements, the DBS systems illustrated in FIG. 2A can identify a patient state using a classifier and can provide adaptive stimulation (e.g., stimulation that changes depending on the patient's state). For example, in some embodiments the frequency of the stimulation may be increased or decreased. Other examples of stimulation changes that may be dynamically updated in various embodiments include, but are not limited to, the range, magnitude, shape, position, pattern, direction, and/or other characteristics of the electrical signals delivered by the pulse generator. While some embodiments relate to STN implants, in other embodiments the DBS electrodes can be implanted in other parts of the brain. For implants in other parts of the brain (e.g., thalamus), the neural networks can be retrained. For example, the spectral signatures of behavioral state could vary by brain area and new patient data would need to be collected for neural net training.

Some embodiments may also automatically determine the patient's state based on the recorded signals. Some embodiments of implanted programmable generator 240 use trained artificial neural networks (ANNs) to take in the LFP patterns recorded by the implants, and infer the patient's sleep state (e.g., awake, REM, or non-REM sleep). In some embodiments, the implanted programmable generator 240 can provide an adaptive DBS system that shuts itself off when the patient is asleep, saving battery power (and in the process, reducing the frequency of the surgeries needed to replace the battery packs).

Various embodiments may use other automated modulations of the DBS stimulation during sleep. For example, those modulations can be used to help treat the sleep deficits suffered by Parkinson's patients. Some embodiments of the ANNs used by implanted programmable generator 240 can identify other patient state variables from the LFP signals, to facilitate other forms of adaptive DBS. As one example, some embodiments could predict whether the patient was trying to move or was at rest and modulate the stimulation appropriately.

In some embodiments, optimized DBS stimulation may have an amplitude setting of a few Volts (e.g., 1-5V at the chosen contact). Those settings can be optimized for a context in which the patient is awake and moving: less stimulation could be needed in other contexts. For example, when a patient is not moving, stimulation just needs to suppress tremor—and not also suppress movement rigidity—so a smaller amplitude could suffice. As such, the stimulation can be turned down (or lower) when the patient is asleep, and potentially when they are not moving. The stimulation may be increased (or turned up) when they are awake, and when they are moving.

Figure 3:
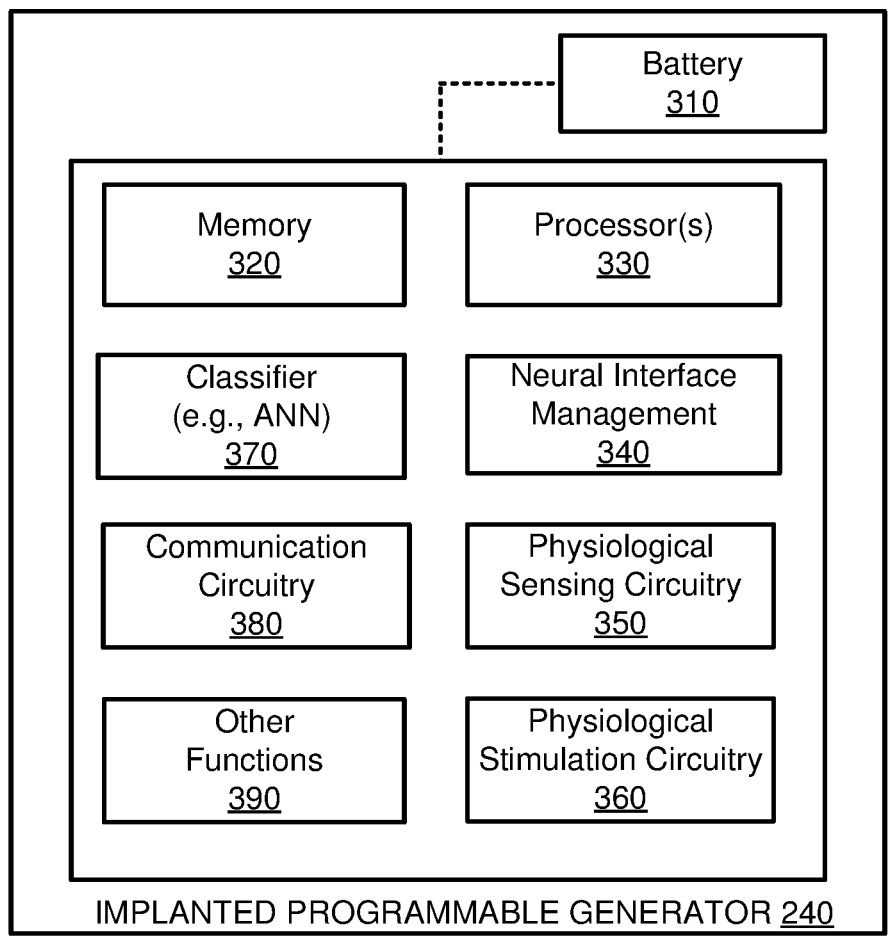
FIG. 3 illustrates a set of components within a programmable generator according to one or more embodiments of the present technology.

FIG. 3 illustrates a set of components within a programmable generator 240 according to one or more embodiments of the present technology. According to the embodiments shown in FIG. 3, programmable generator 240 can include battery 310 (e.g., a rechargeable battery), memory 320, processor(s) 330, neural interface management circuitry 340, physiological sensing circuitry 350, physiological stimulation circuitry 360, classifier 370, communication circuitry 380, and/or circuitry 390 to perform other functions. The circuitry can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these components along with other modules, circuitry, applications, and/or components. Still yet, some embodiments may incorporate two or more of these components into a single component or module and/or associate a portion of the functionality of one or more of these components with a different component. For example, in one embodiment, physiological sensing circuitry 350 and physiological stimulation circuitry 360 can be combined into a single module for sensing and stimulation.

Memory 320 can be any device, mechanism, or populated data structure used for storing information. In accordance with some embodiments of the present technology, memory 320 can encompass any type of, but is not limited to, volatile memory, nonvolatile memory and dynamic memory. For example, memory 320 can be random access memory, memory storage devices, optical memory devices, media magnetic media, SDRAM, RDRAM, DDR RAM, erasable programmable read-only memories (EPROMs), electrically erasable programmable read-only memories (EEPROMs), and/or the like. In accordance with some embodiments, memory 320 may include one or more tables, one or more files, local cache memories, processor cache memories, relational databases, flat databases, and/or the like. In addition, those of ordinary skill in the art will appreciate many additional devices and techniques for storing information which can be used as memory 320.

Memory 320 may be used to store instructions for running one or more applications or modules on processor(s) 330. For example, memory 320 could be used in one or more embodiments to house all or some of the instructions needed to execute the functionality of neural interface management circuitry 340, physiological sensing circuitry 350, physiological stimulation circuitry 360, classifier 370, and/or communication circuitry 380 as software modules.

Neural interface management circuitry 340 can provide an interface to electrodes (e.g., electrode array 220 in FIG. 2A). Physiological sensing circuitry 350 and physiological stimulation circuitry 360 can select or designate one or more electrodes from the array for sensing and/or stimulation. Physiological sensing circuitry 350 and physiological stimulation circuitry 360 provide a variety of additional functions to process sensed signals (e.g., filtering, amplification, isolation, normalization and the like) and preprocess signal for delivering stimulation (e.g., charge balancing, timing, etc.) Classifier 370 can receive the sensed signals and identify a state of the patient (e.g., a sleep state). This can be used by the physiological stimulation circuitry 360 in making a decision on the appropriate therapy to be delivered. Communication circuitry 380 can be used to receive firmware updates and/or communicate with external computing devices (e.g., external monitoring systems 170A-170N in FIG. 1).

Additional circuitry 390 can provide a variety of other capabilities such as measuring (or estimating) additional physiological parameters including heart rate, blood pressure, temperature, accelerations of body parts of the patient (e.g., head), and the like. In some embodiments, additional circuitry 390 can monitor charge or state of battery 310. This information can be used to predict whether there is enough charge to deliver desired therapy over a period of time (e.g., during the night, until the next recharging cycle, etc.). In some embodiments, programmable generator 240 may revert to a low power mode of operation. In some cases, programmable generator 240 may transition to a standard, non-adaptive stimulation mode which may require less power.

Figure 4:
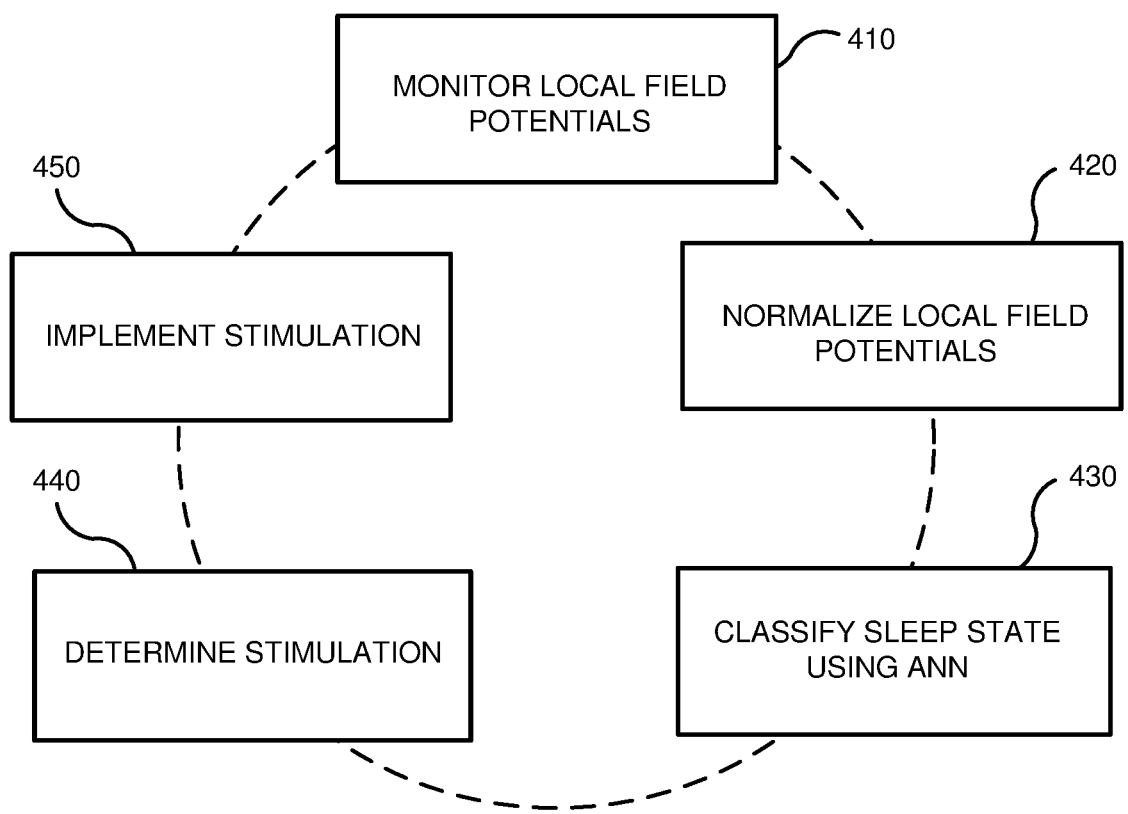
FIG. 4 illustrates a set of operations that may be used for the closed-loop control of DBS according to one or more embodiments of the present technology.

FIG. 4 illustrates a set of operations 400 that may be used for the closed-loop control of DBS according to one or more embodiments of the present technology. As illustrated in FIG. 4, monitoring operation 410 can monitor local field potentials. Normalization operation 420 can normalize the local field potentials (e.g., by scaling the signal so the peak absolute power level—magnitude—is equal to one). The normalized signals can then be used by classification operation 430 to identify a sleep state. Using the sleep state, determination operation 440 can determine a stimulation therapy. For example, if the current sleep state identified by classification operation 430 is that the patient is in REM sleep, then no therapy may be provided. In some embodiments, this may be done using a feedback controller using coarse and/or fine adjustments. Once the stimulation therapy is determined, implementation operation 450 causes the DBS system to deliver the therapy.

Figure 5:
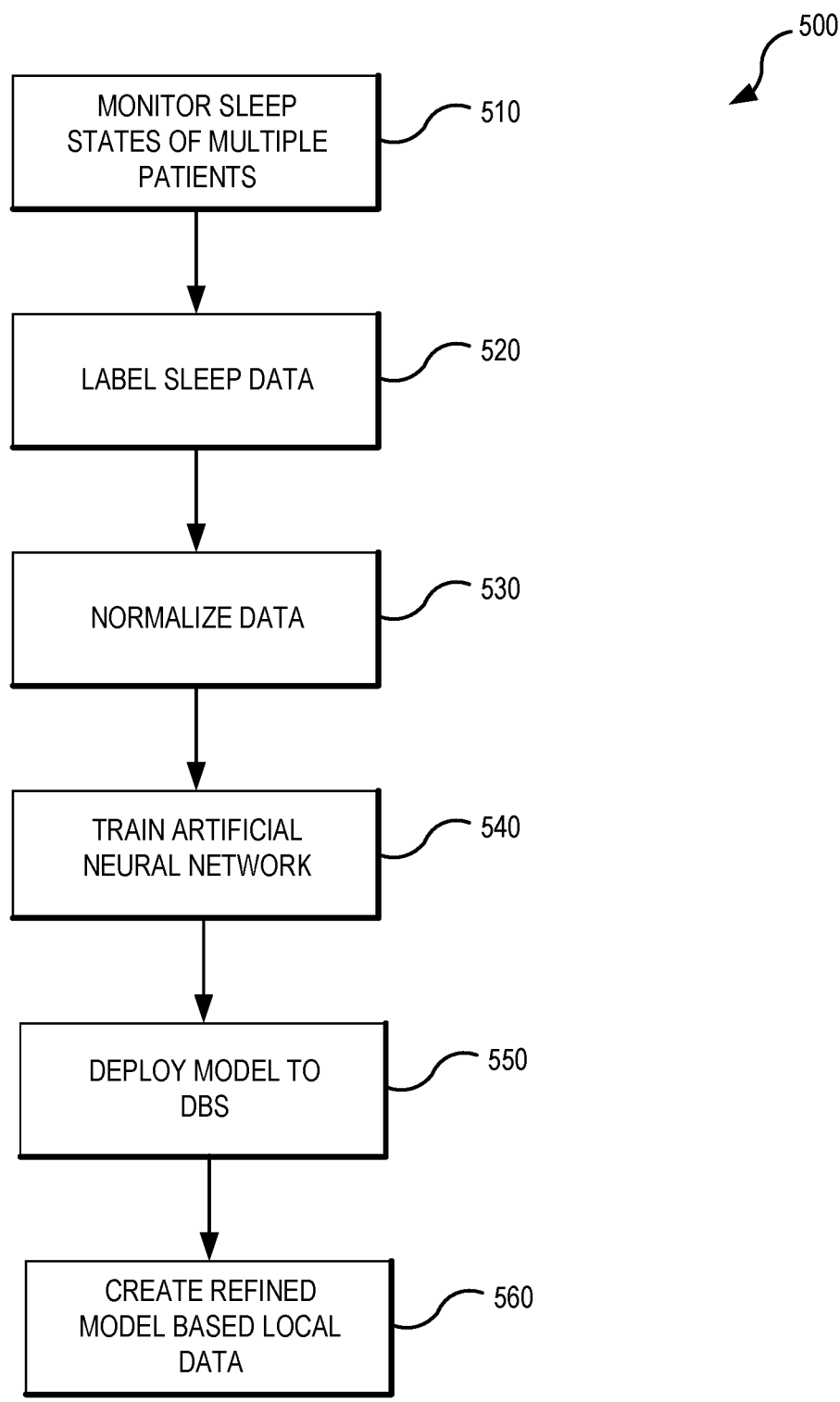
FIG. 5 is a flowchart illustrating a set of operations for training a DBS system in accordance with some embodiments of the present technology.

FIG. 5 is a flowchart illustrating a set of operations 500 for training a DBS system in accordance with some embodiments of the present technology. As illustrated in FIG. 5, monitoring operation 510 can monitor the sleep of multiple patients. In accordance with various embodiments, the data collected can be locally stored within a memory of the DBS system and transmitted to a computing device (e.g., charging station, smart phone, cloud-based server such as 130 in FIG. 1, etc.). In accordance with some embodiments, any local computing device may act as an intermediary and send uploaded data to a cloud-based server for processing and global training of a general model. This transfer may be done immediately, on a predetermined schedule (e.g., periodically), upon triggering of an event (e.g., amount of data collected, status of local device, or the like), or upon request from the could-based server. In some embodiments, labeling operation 520 can label the sleep states of the recorded data which can also be normalized using normalization operation 530. This may be done by the local device or by the cloud-based platform. One advantage of performing normalization operation 530 locally is that this results in distributed processing of the data.

In some embodiments, the patient data may be anonymized before training of the neural nets or other machine learning technique. In some embodiments, all personally identifiable information (PII) may be removed leaving only physiological measurements collected. This anonymization of the data can happen in a protected environment to ensure compliance with all applicable laws. Then, the de-identified data can be transmitted to a different location (if needed) to train the neural network or other system.

Training operation 540 can use the normalized data (e.g., collected from many different patients) to train an artificial neural network (or other supervised classifier). In accordance with various embodiments, training operation 540 may train multiple neural nets for different patient categories. As such, some embodiments of the implant can be configured to automatically select the best neural net for each patient (e.g., based on LFP signals). For example, in some embodiments, spectral signatures in the LFP can be compared to a "template" for each neural net and the implant can select the best pre-trained neural net for that patient.

Once trained, the model can be deployed via deployment operation 550 to various deep brain stimulation systems implanted within various patients. In some embodiments, each local deep brain stimulation system can collect local data and create a refined model using local training operation 560. As such, the deep brain stimulation system may dynamically alter how stimulation is provided based on real-time and/or historical feedback collected for a particular patient.

Figure 6:
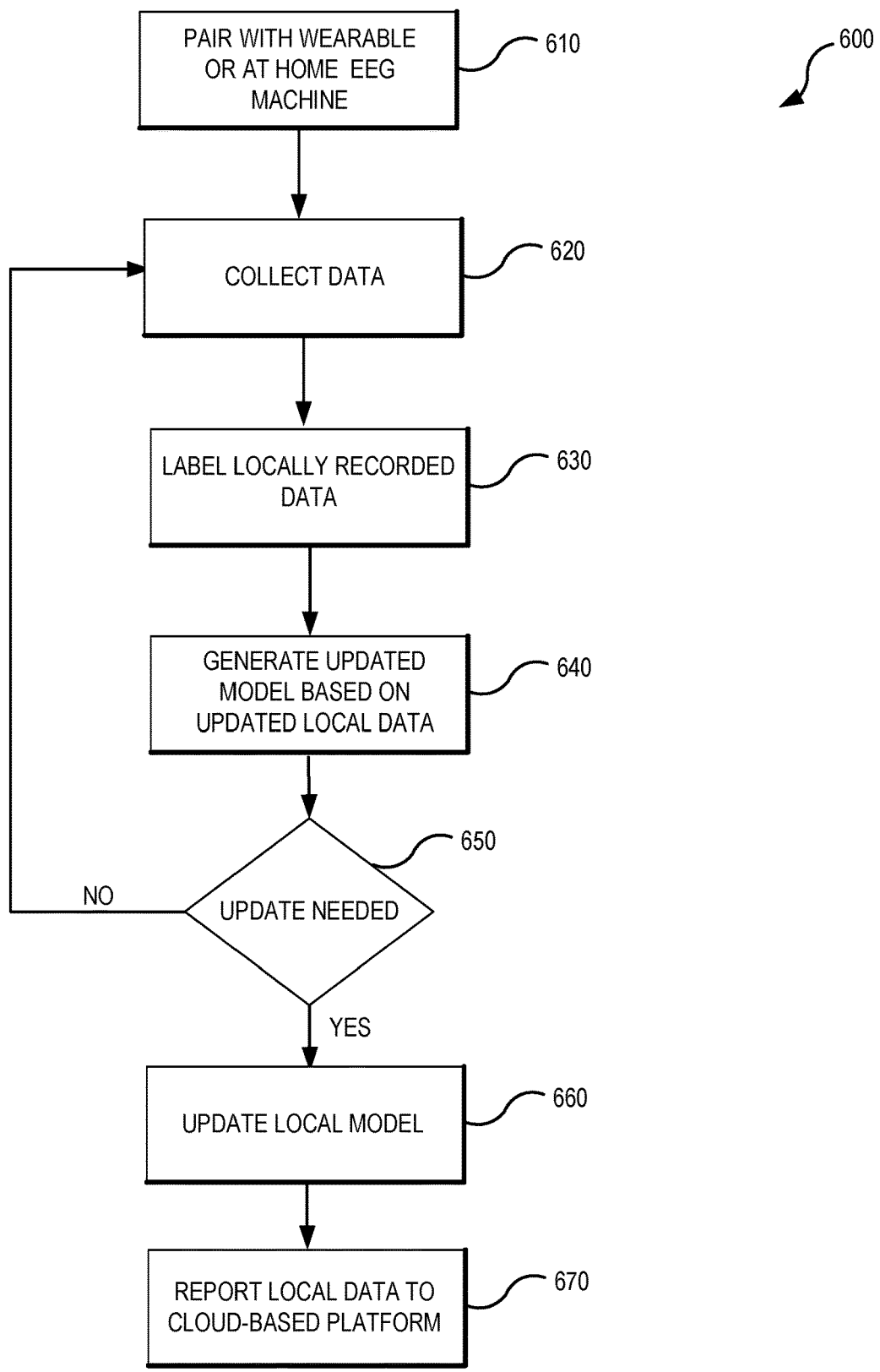
FIG. 6 is a flowchart illustrating a set of operations for updating a global model of a classifier with locally collected data in accordance with one or more embodiments of the present technology.

FIG. 6 is a flowchart illustrating a set of operations 600 for updating a global model of a classifier with locally collected data in accordance with one or more embodiments of the present technology. As illustrated in FIG. 6, pairing operation 610 pairs the deep brain stimulation system with an external data collection device (e.g., wearable, at home EEG system, etc.) that can be used to collect data regarding the sleep state of the patient during data collection operation 620. Labeling operation 630 can label the locally recorded data to create a local training set from the collected data. Update operation 640 can generate an update to the model based on the local training.

Determination operation 650 can determine whether the updated model is authorized to be installed. For example, there may be a minimum amount of collected data or the user/doctor may be content with the current performance and request that no updates be installed. There may be other limitations based on time, performance increase thresholds, and the like. When determination operation 650 determines that an update is not needed, then determination operation 650 branches to data collection operation 620. When determination operation 650 determines that an update is needed, then determination operation 650 branches to update operation 660 where the local model is updated (e.g., via a firmware update). Reporting operation 670 can report the locally collected data to a cloud-based platform for further analysis and/or inclusion into a larger training data set.

Figure 7:
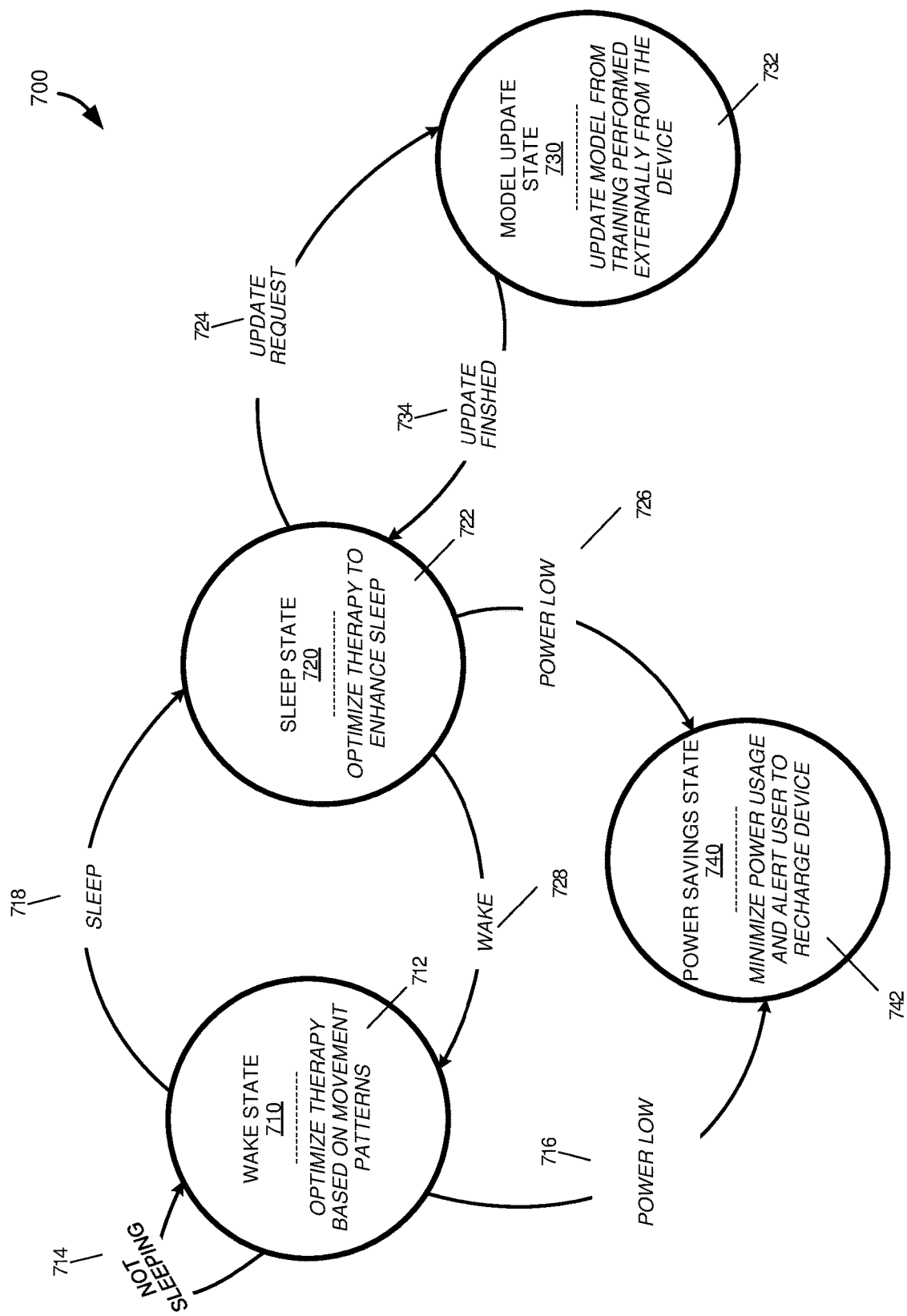
FIG. 7 is a state flow diagram illustrating a set of states of a DBS system in accordance with various embodiments of the present technology.

FIG. 7 is a state flow diagram illustrating a set of states of a DBS system in accordance with various embodiments of the present technology. In the embodiments illustrated in FIG. 7, the state flow diagram 700 can includes states 710, 720, 730, and 740, entry actions 712, 722, 732, and 742, and transition conditions 714, 716, 718, 724, 726, 728, and 734. The state operations and transitions shown in state flow diagram 700 may be performed in various embodiments by a DBS system such as, for example, DBS 120A-120N of FIG. 1, or one or more controllers, modules, engines, processors, or components associated therewith. Other embodiments may include additional or fewer states, entry actions, and/or transition conditions than those illustrated in the embodiments shown in FIG. 7.

A DBS system may be placed into wake state 710 to perform entry action 712 which optimizes the stimulation therapy based on movement patterns, physiological readings, and/or other factors. Transition condition 714 allows the DBS system to remain in wake state 710 when a determination is made that the patient is still not sleeping. Once a determination is made that the patient is sleeping, transition condition 718 transitions the DBS system from wake state 710 to sleep state 720. Upon entering sleep state 720, entry action 722 is executed which optimizes the therapy for enhancing sleep. Transition condition 728 allows for the DBS system to transition out of sleep state 720 into wake state 710. While not illustrated in FIG. 7, in some embodiments, sleep state 720 may include multiple sub-state representing stages of sleep (e.g., REM sleep, Non-REM sleep, or the like). The system may use different transition criteria to transition into and out of these sub-states which provide for more refined therapy conditions.

From any state, update request 724 may be initiated. This may be an external request (e.g., from a charging station or other external interface). State update request 724 will cause the DBS system to transition to model update state 730 where entry action 732 will cause the DBS system to prepare to receive a model update with entry action 742. Once the update is completed, completion transition condition 734 will cause the system to return to one of the other states. When a lower power transition condition 716 or 726 (e.g., battery level below a threshold, user request, etc.) is detected, the DBS system can transition from wake state 710 or sleep state 720 to power saving state 740, where power usage can be minimized via execution of entry action 742.

Experimental Results

To illustrate the effectiveness of some embodiments of the present technology, STN LFP recordings were collected from 9 PD patients, via a percutaneous cable attached to the DBS lead, during a full night's sleep (6-8 hours) with concurrent polysomnography (PSG). A feedforward neural network was trained to prospectively identify sleep stage with PSG-level accuracy from 30-second epochs of LFP recordings. The model's sleep stage predictions matched clinician-identified sleep stage with a mean accuracy of (90-95%) on held-out epochs. Furthermore, Leave-One-Group-Out analysis demonstrates 90% mean classification accuracy for novel subjects. These results which classify sleep stage across a typical heterogenous sample of PD patients may indicate spectral biomarkers of sleep common to this neurodegenerative condition.

Patient Demographics

This study was approved by the Institutional Review Board of the University of Minnesota, where the surgical and recording procedures were performed. All consented study subjects (n=9) carried a diagnosis of idiopathic Parkinson's disease (PD). Demographic data and sleep stage characteristics for PD subjects participating in this study (n=9) are shown in FIG. 8A. The percent improvement in PD reflects the change in the Unified Parkinson's Disease Rating Scale (UPDRS) motor scale before and after DBS surgery.

Subjects were unilaterally implanted in STN with a quadripolar DBS electrode (model #3389: Medtronic Inc., Fridley, MN), per routine surgical protocol. Experimental details for the recording setup can be found in the following reference which is hereby incorporated by reference in its entirety for all purposes: Thompson, J. A., Tekriwal, A., Felsen, G., Ozturk, M., Telkes, I., Wu, J., Abosch, A. (2018). Sleep patterns in Parkinson's disease: Direct recordings from the subthalamic nucleus. Journal of Neurology, Neurosurgery and Psychiatry, 89, 95-104. https://doi.org/10.1136/jnnp-2017-316115."

Figure 8B:
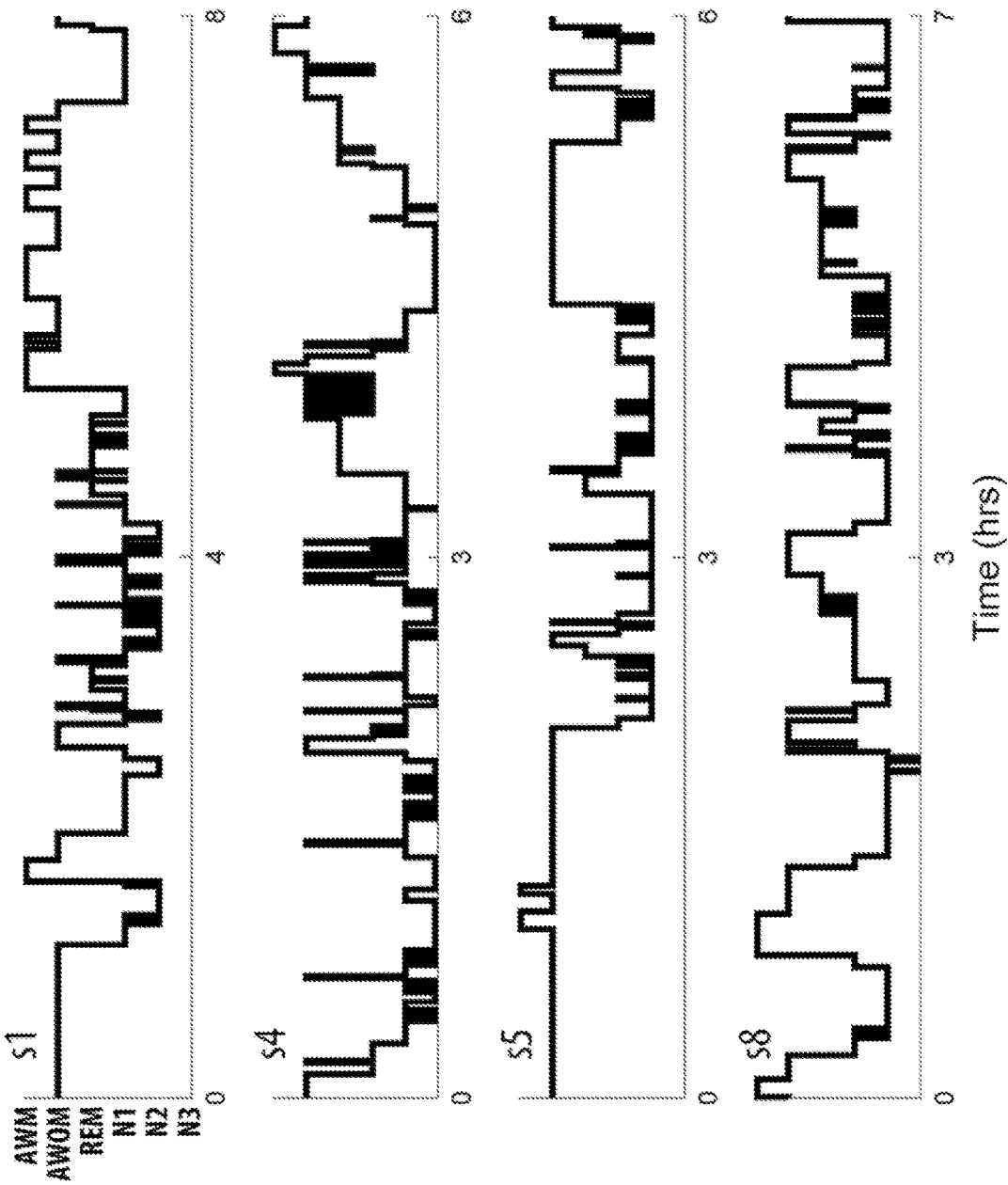
Figure 8C:
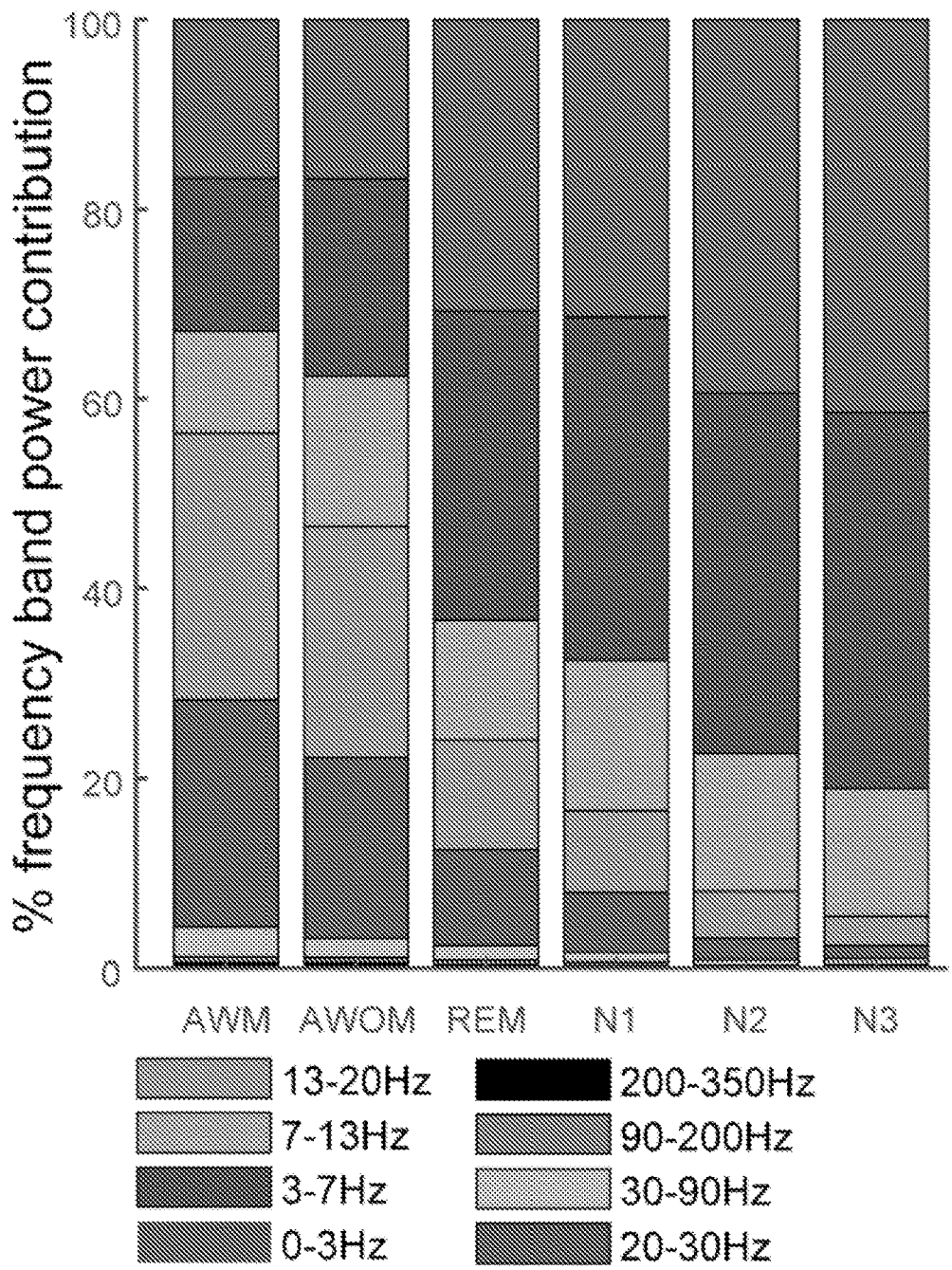

FIG. 8B shows Hypnograms from four representative subjects in this study, indicative of common sleep architecture deficits reported for individuals with PD. FIG. 8C shows the distribution of frequency band power contribution to sleep stage for all subjects where AWM is awake with movement, AWOM is awake without movement, and REM is rapid eye movement.

Signal Processing of Local Field Potentials

Briefly, after preprocessing, the four LFP channels (0, 1, 2 and 3)—one recording from each of the four electrical contacts of the implant—were converted into three bipolar derivations (LFP01, LFP12 and LFP23) by sequentially referencing them. Power spectral density (PSD) was estimated using a Fast Fourier Transform from a 2 s long sliding window (Hamming) with 1 s overlap. The final time-evolving spectra had 15 s time and 0.5 Hz frequency resolution. For each subject, LFP data selected for further analysis were based on the location of the DBS electrode contact within the STN and this was verified by the following: (a) intraoperative microelectrode recordings that identified cells with firing characteristics consistent with STN neurons; (b) anti-Parkinsonian benefit and side-effects of macrostimulation; (c) preoperative stereotactic T1- and T2-weighted images merged to a postoperative MRI demonstrating the position of the DBS electrode within the borders of STN; (d) the use of Framelink (Medtronic Corp.) software to analyze DBS position on the postoperative MRI; and (e) evaluation of the efficacy of post-programming stimulation for contralateral motor symptoms for each subject. Selection of which contact(s) to use for study recordings was based on the STN contact(s) associated with peak beta-spectrum activity as this feature correlates with the optimal programming contact(s) for the treatment of contralateral motor symptoms. These criteria were used to ensure that the selected contact was most reliably in the same relative anatomical location across patients to permit generalizability of the model.

Video-PSG Scoring

The polysomnographic electrode montage used was the following: F3-C3, P3-O1, F4-C4 and P4-O2, EOGL-A2, EOGR-A1 and chin EMG. Sleep stages were determined by analyzing 30 s epochs of the PSG, by a sleep neurologist, with each epoch classified as Awake or as belonging to one of the following sleep stages: rapid eye movement (REM), or the non-REM (NREM) stages of N1, N2 or N3.

Model Description

Figure 9A:
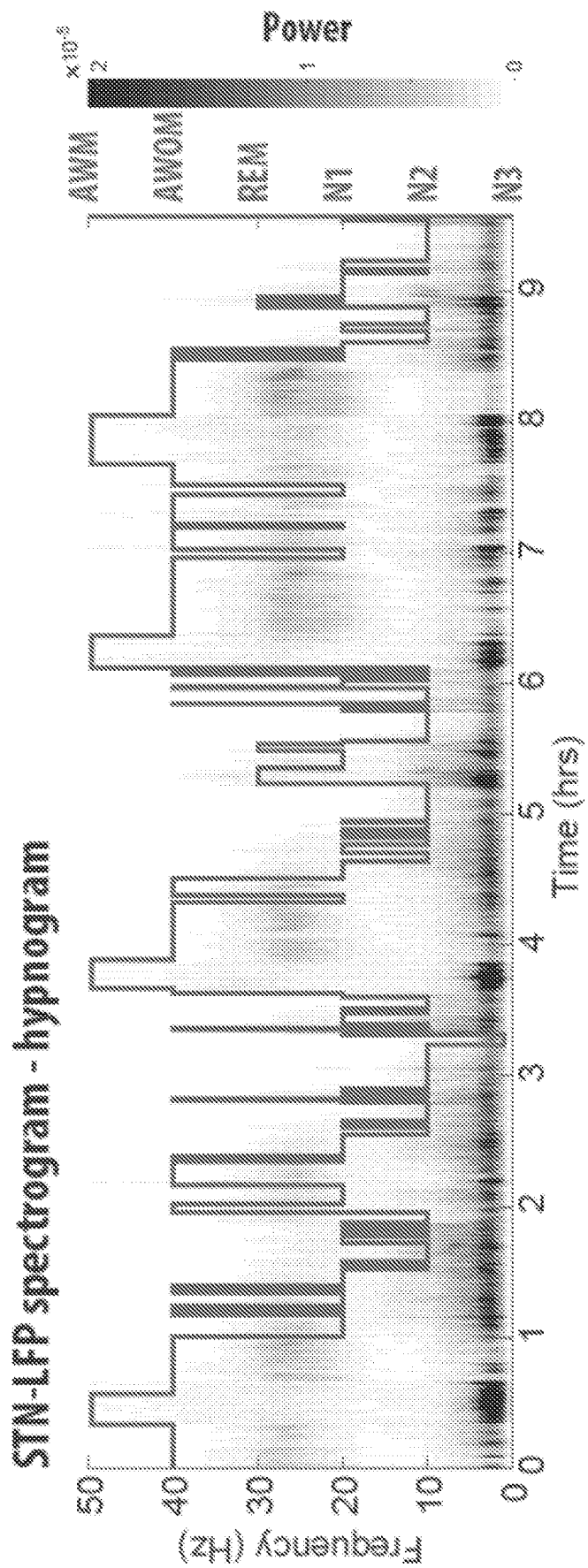
FIG. 9A illustrates a spectrogram and hypnogram of subthalamic nucleus (STN) local field potentials that may be collected according to various embodiments of the present technology.

FIG. 9A is an example of a representative spectrogram of a local field potential (LFP) recording acquired over the course of one full night's sleep from a deep brain stimulation (DBS) electrode implanted into the subthalamic nucleus (STN). A PSG informed hypnogram assessed by a sleep expert is aligned with the LFP recordings (AWM, awake with movement; AWOM, awake without movement; REM, rapid eye movement; N1-3, non-rapid eye movement stages 1-3).

Figure 9B:
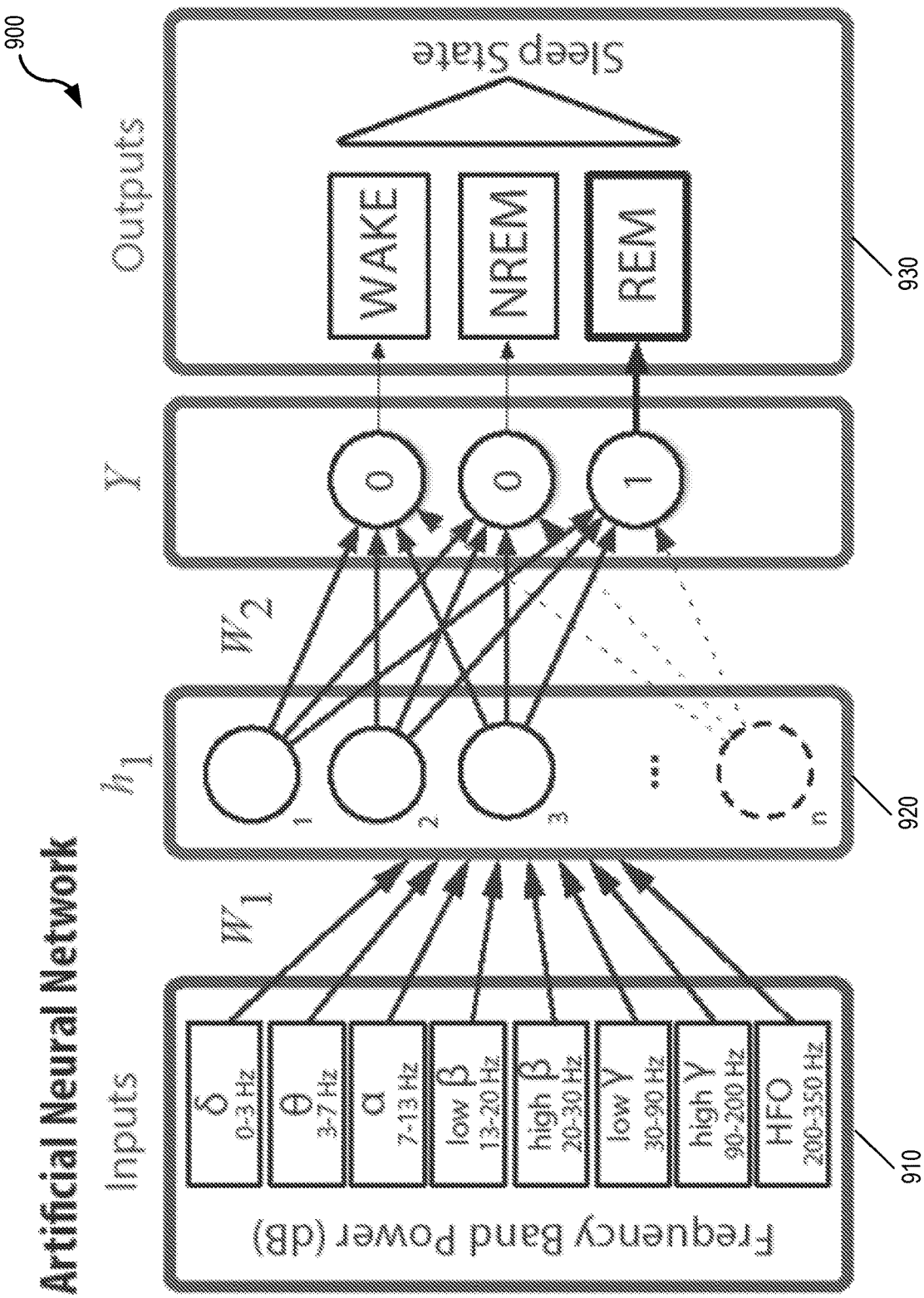
FIG. 9B illustrates an example of an artificial neural network that may be used in one or more embodiments of the present technology.

FIG. 9B is a schematic of a representation of the feedforward classifier 900 used to predict sleep stage from 30-s labelled LFP epochs in accordance with various embodiments of the present technology. As illustrated in FIG. 9B, the model 900 is composed of an input layer 910 (LFP frequency power bands), a hidden layer 920 and an output layer 930 (predicted sleep stage). In accordance with the various embodiments used in this experiment, a feedforward artificial neural network (ANN) was trained with a single hidden layer (FIG. 9B) to prospectively identify whether a given 30-s epoch of STN-LFP recording took place during one of three possible states: REM, NREM or Awake. Inputs to the model were eight separate frequency band power bins, averaged over 30 s: delta (0-3 Hz), theta (3-7 Hz), alpha (7-13 Hz), low beta (13-20 Hz), high beta (20-30 Hz), and low gamma (30-90 Hz), high gamma (90-200) and high frequency oscillations (200-350).

Figure 9C:
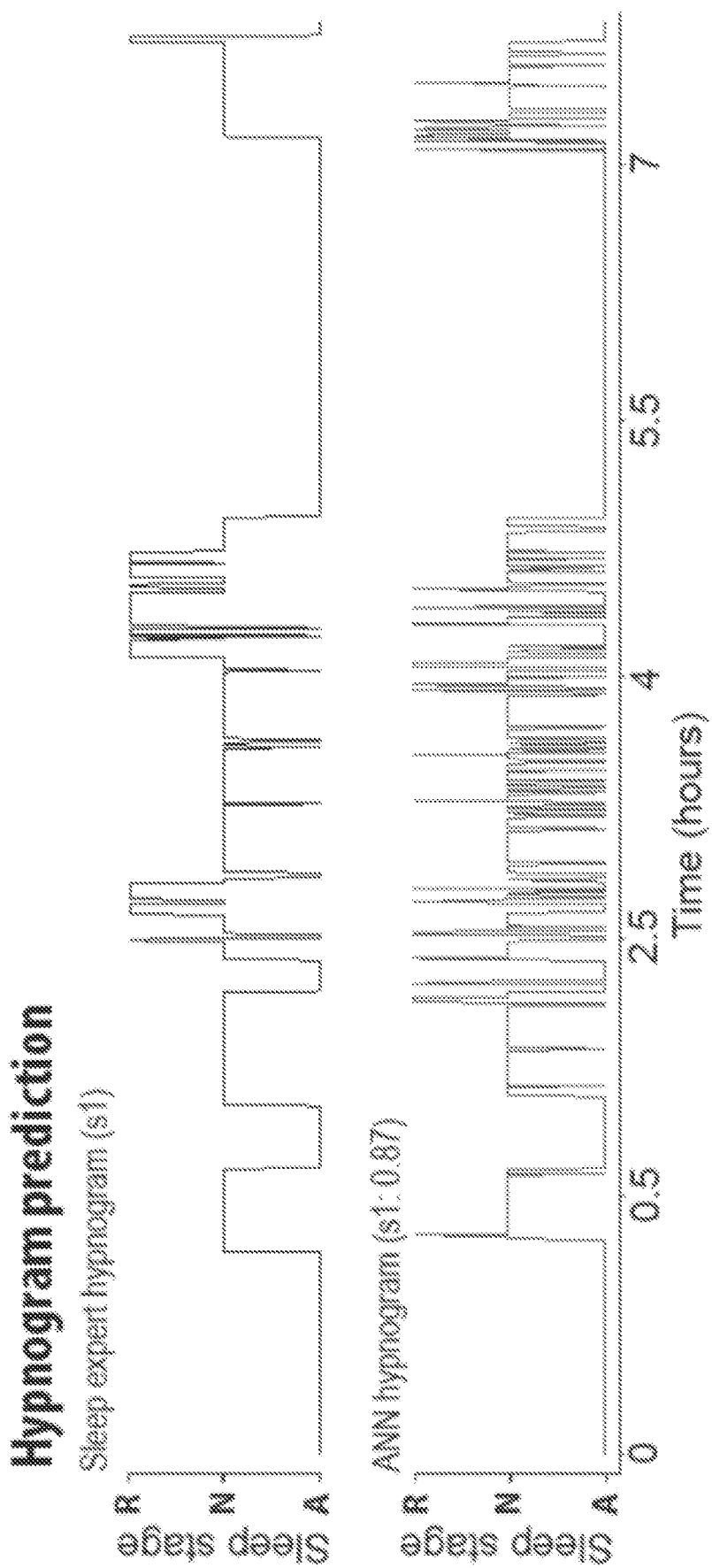
FIG. 9C illustrates an example of a hypnogram prediction that may be generated in some embodiments of the present technology.

In this experiment, each frequency range input feature was normalized independently by subtracting the mean and scaling by the variance of feature. The ANN output was a probability that the measured epoch occurs during one of the three possible states. Optimal ANN architecture was chosen based on the hyperparameter optimization detailed below. The ANN model utilizes a single hidden layer to encode the normalized spectral power bands within 32 features by calculating weighted sums of the input frequency power and scaling them by a non-linear function. Weighted linear combinations of these 32 features are then used by the network to compute sleep state probabilities with application of a softmax non-linearity. FIG. 9C shows a comparison of hypnogram assessed by a sleep expert (top) and ANN predicted hypnogram (bottom) from patient 1 with mean classification accuracy of 87%.

Hyperparameter Optimization

The architecture of the ANN model was determined by evaluating classification accuracy across the spectrum of network hyperparameters. The non-linearity of each unit (Sigmoid, ReLu and Tanh) was combinatorically varied as were the number of units in the hidden layer(s) (16, 32 or 64) and the number of hidden layers (1 or 2). Randomly initialized models in replicates of five were each trained and tested on a random 80:20 partition of all data. In general, more complex models with a larger number of total units and multilayer networks were observed to produced minor increases in classification accuracy, but these performance variations were not statistically significant. Ultimately, 32 units in a single hidden layer with the biology-inspired rectified linear units (ReLu) as the non-linearity. This configuration was chosen, in part, because it achieved classification accuracy on a par with the best-performing model with 10-fold fewer parameters to minimize overfitting training data.

Model Performance and Validation

The model's sleep stage classification performance was evaluated along with its ability to generalize new predictions under two conditions. Performance was evaluated using accuracy $$\left(A_{observed} = \frac{Correct}{Correct + Incorrect}\right),$$

and Cohen's $$K\left(\kappa = \frac{A_{observed} - A_{chance}}{1 - A_{chance}}\right).$$

Chance accuracy ($A_{chance}$) was calculated as originally described in the following reference which is hereby incorporated by reference in its entirety for all purposes: Cohen, J. (1960). A coefficient of agreement for nominal scales. Educational and psychological measurement, 20, 37-46. https://doi.org/10.1177/001316446002000104.

Figure 10A:
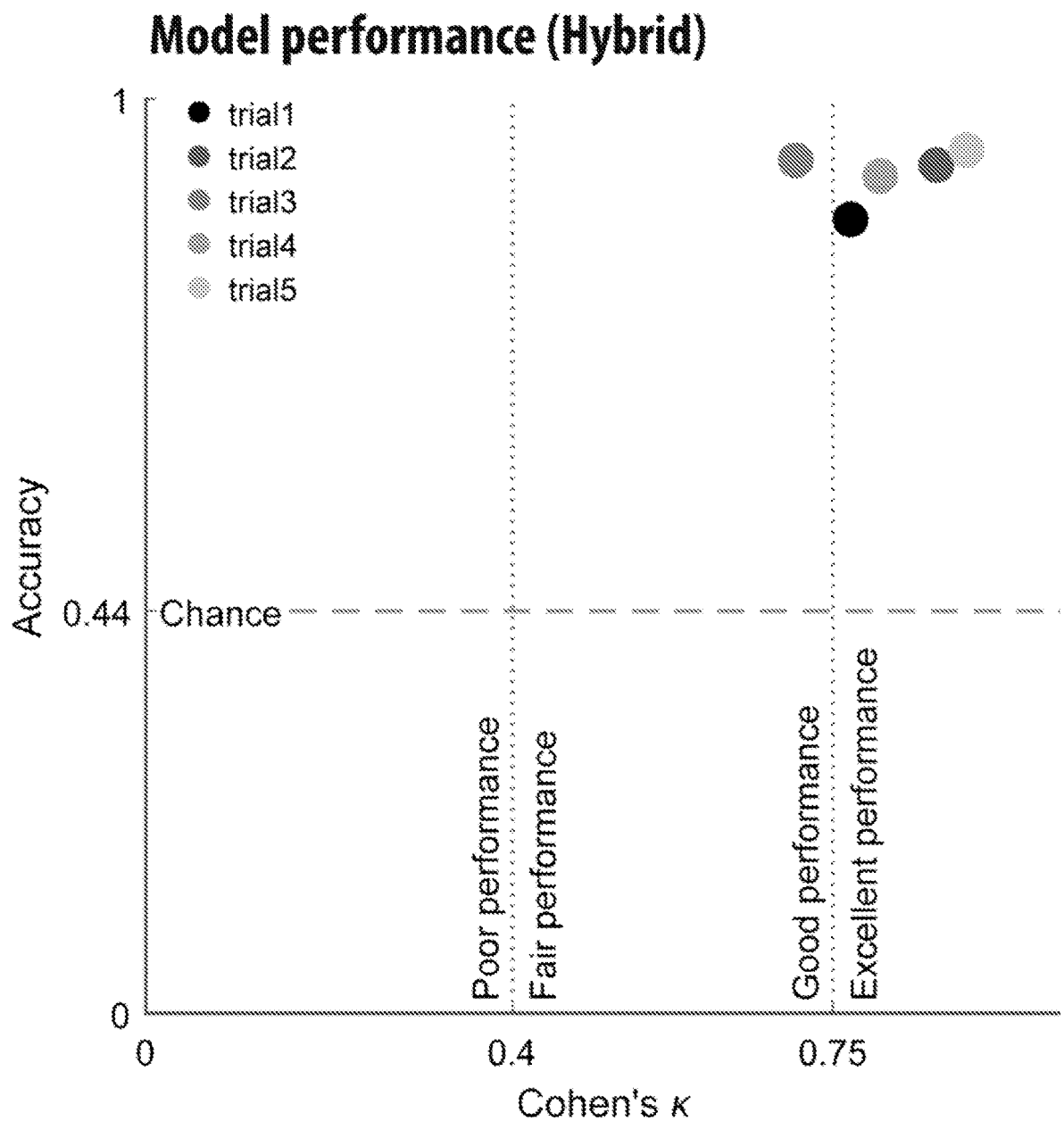
FIGS. 10A-10C illustrate performance of various models generated according to various embodiments of the present technology.

First, the model's ability to predict sleep stages on novel examples from patients included in the training set was tested. Then, 80% of each patient's 30-s STN-LFP recording epochs across all nine patients were pooled to train the model. The remaining 20% of the withheld epochs were used to evaluate the model's performance on novel examples from familiar patients. The train-test fractions (80:20) were sampled randomly for each patient and performance was averaged in replicates of five to prevent sampling bias. The model was able to correctly predict sleep stage from STN-LFP epochs with a mean accuracy of 91% (FIG. 10A).

Figure 10B:
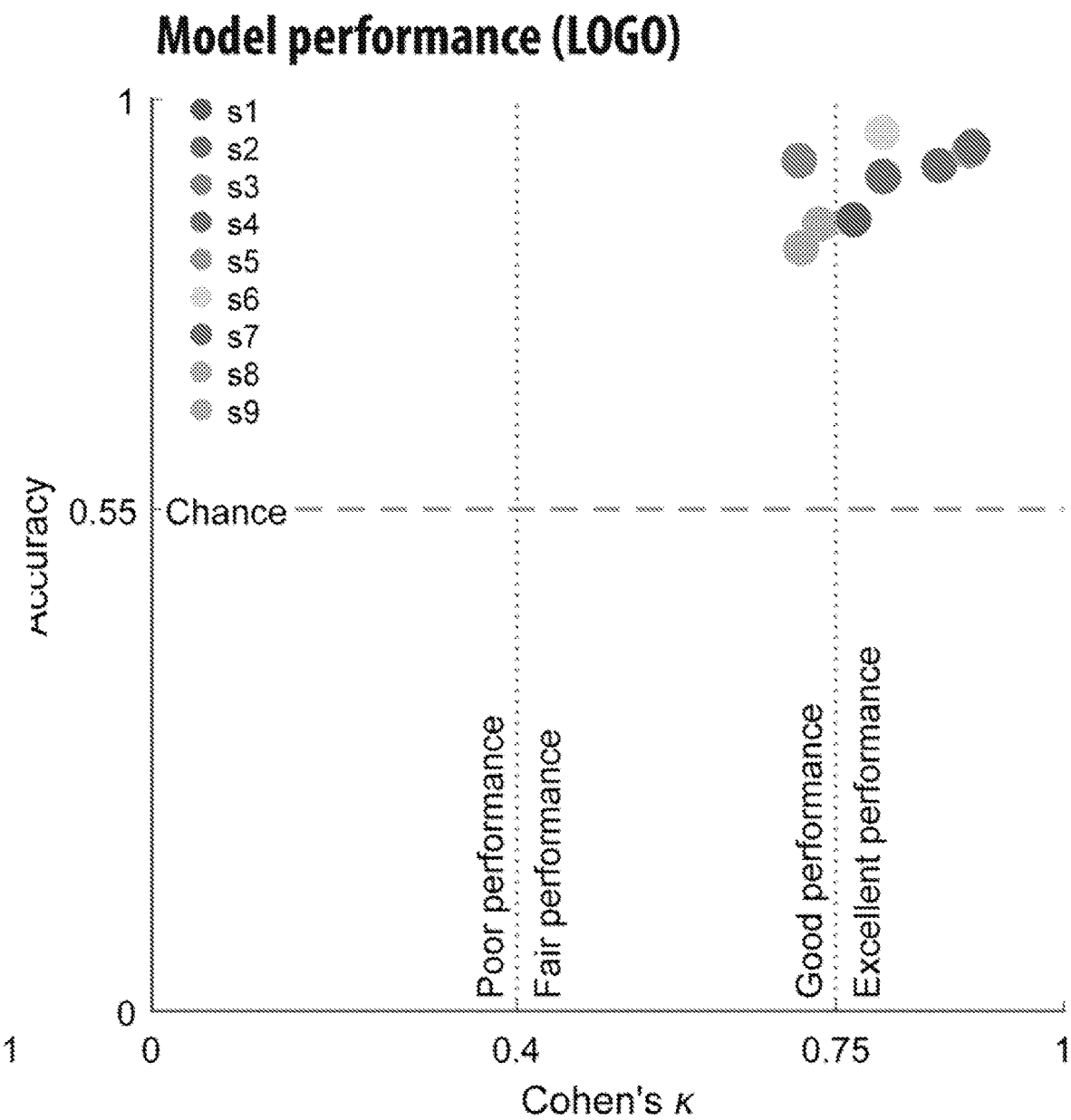
Figure 10C:
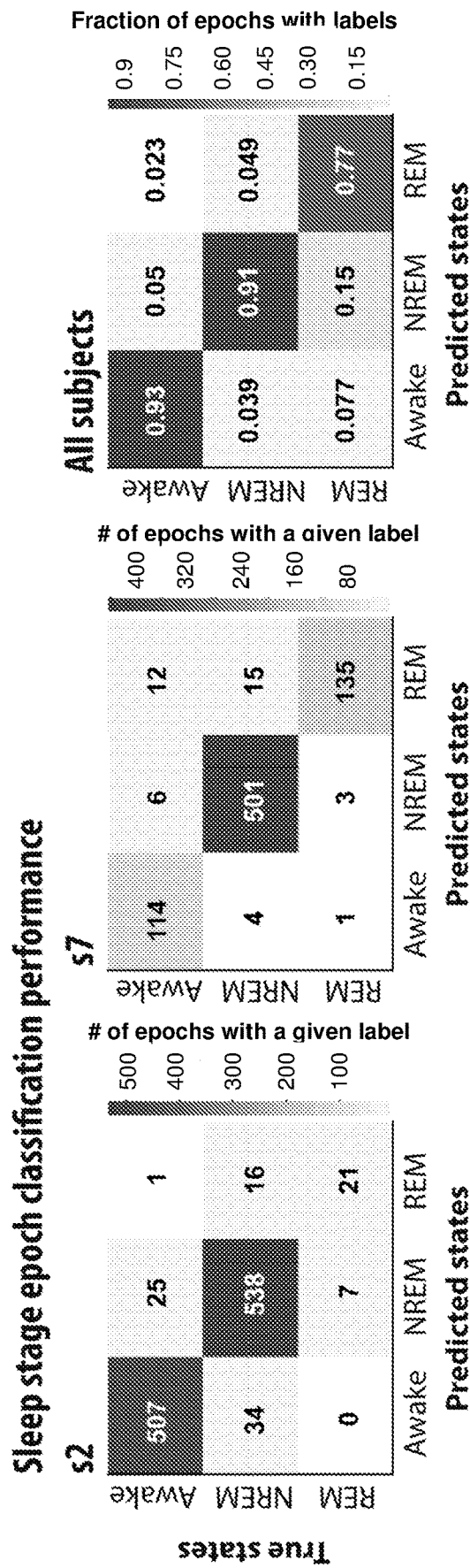

Training a model from scratch for each new patient is often intractable. Therefore, the model's ability to perform well on never seen subjects demonstrates its sensitivity to the salient spectral features of sleep across individual variations. To test this level of generalization, the model was trained on all epochs from eight of the nine patients. Subsequently, model performance was evaluated on all epochs from the kept-out patient. Thus, nine different models were trained, each with a specific patient withheld from its training data. As above, model performance was quantified using accuracy and Cohen's κ (FIG. 10B). Across all models, mean classification accuracy of 91% was observed. Finally, because the number of epochs of each observed sleep state varies between patients in the dataset, we produced confusion matrices for the test patient of each model and show representative examples from patients with significantly imbalanced sampling as well as a summary matrix averaged across all models (FIG. 10C). This demonstrates that the model's error rate varies as a function of sleep-stage representation, with less frequent stages showing a higher error rate as shown in the following Table.

| Subject ID | Awake | | NREM | | REM | |
|---|---|---|---|---|---|---|
| | % of epochs | % correct | % of epochs | % correct | % of epochs | % correct |
| 1 | 50 | 91 | 42 | 90 | 9 | 47 |
| 2 | 46 | 94 | 51 | 94 | 2 | 55 |
| 3 | 88 | 98 | 11 | 69 | 1 | 0 |
| 4 | 16 | 82 | 73 | 95 | 11 | 84 |
| 5 | 53 | 99 | 43 | 96 | 3 | 39 |
| 6 | 88 | 96 | 12 | 100 | 0 | NA |
| 7 | 17 | 96 | 66 | 98 | 18 | 83 |
| 8 | 27 | 94 | 61 | 85 | 12 | 83 |
| 9 | 40 | 96 | 60 | 100 | 0 | NA |

This experiment demonstrates the novel use of an optimized ANN to predict sleep stage from 30-second epochs of LFP recorded from the STN of PD subjects in accordance with various embodiments of the present technology. Based on results from hyperparameter optimization, a network architecture of a single hidden layer containing 32 artificial neurons with ReLu non-linearities (FIG. 9B) was used. The model's ability to generalize to new patients was evaluated by using a LOGO (Leave-One-Group-Out) strategy for cross-validation and attained mean classification accuracy of 90% averaged across all patients.

The ability of this ANN model to accurately predict sleep stages based on STN-LFP data recorded from novel PD patients is a critical improvement over previously published efforts to generate predictive models. Some embodiments may use a Support Vector Machine (SVM) model that can perform well when tested on novel epochs derived from the familiar patient used to train the model, but may be more difficult to generalize to novel subjects. This study is the first to use direct intracranial recordings from human basal ganglia to classify unseen, non-PSG labeled electrophysiological signals.

This model can be implemented in forthcoming improved DBS implanted neuro-stimulators (e.g., Olympus RC+S and PC+S; Medtronic, Inc., Fridley, MN) to detect sleep stage solely from features of STN-recorded LFP, enabling the implementation of closed-loop stimulation strategies for the treatment of patient symptoms. The use of DBS for ameliorating sleep dysregulation in PD would serve a crucial unmet need in this patient population, as there are currently no effective treatments with low side-effect burden. Although DBS is an established therapy for the treatment of motor symptoms of Parkinson's disease, the effect of DBS on the sleep disturbances of Parkinson's disease has not yet been fully characterized, and the mechanism(s) underlying the improvements reported in sleep quality, efficiency and duration remains to be elucidated.

In accordance with various embodiments, the model's ability to correctly predict sleep stage in novel subjects may imply the existence of a universal LFP spectrum sleep signature. This spectral signature appears conserved across patient demographics, robust to variances in implantation location, and detectable from the aggregate activity of several thousands of neurons. In some embodiments, this spectral signature space can be characterized using generative ANN models of LFP oscillations. One application of this is that we could make "template" LFP spectra for the neural net, showing what it looks for in its input signals. Some embodiments can train several neural nets, each on different classes of patient (e.g., separated by, e.g., age, gender, disease progression, etc.). These templates would let an algorithm: a) match each patient to the closest-matching neural net (the one whose templates are closest); and b) use that neural net on the patient. In this way, patient variation could be automatically accommodated.

Exemplary Computer System Overview

Aspects and implementations of the data analyzer of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 11:
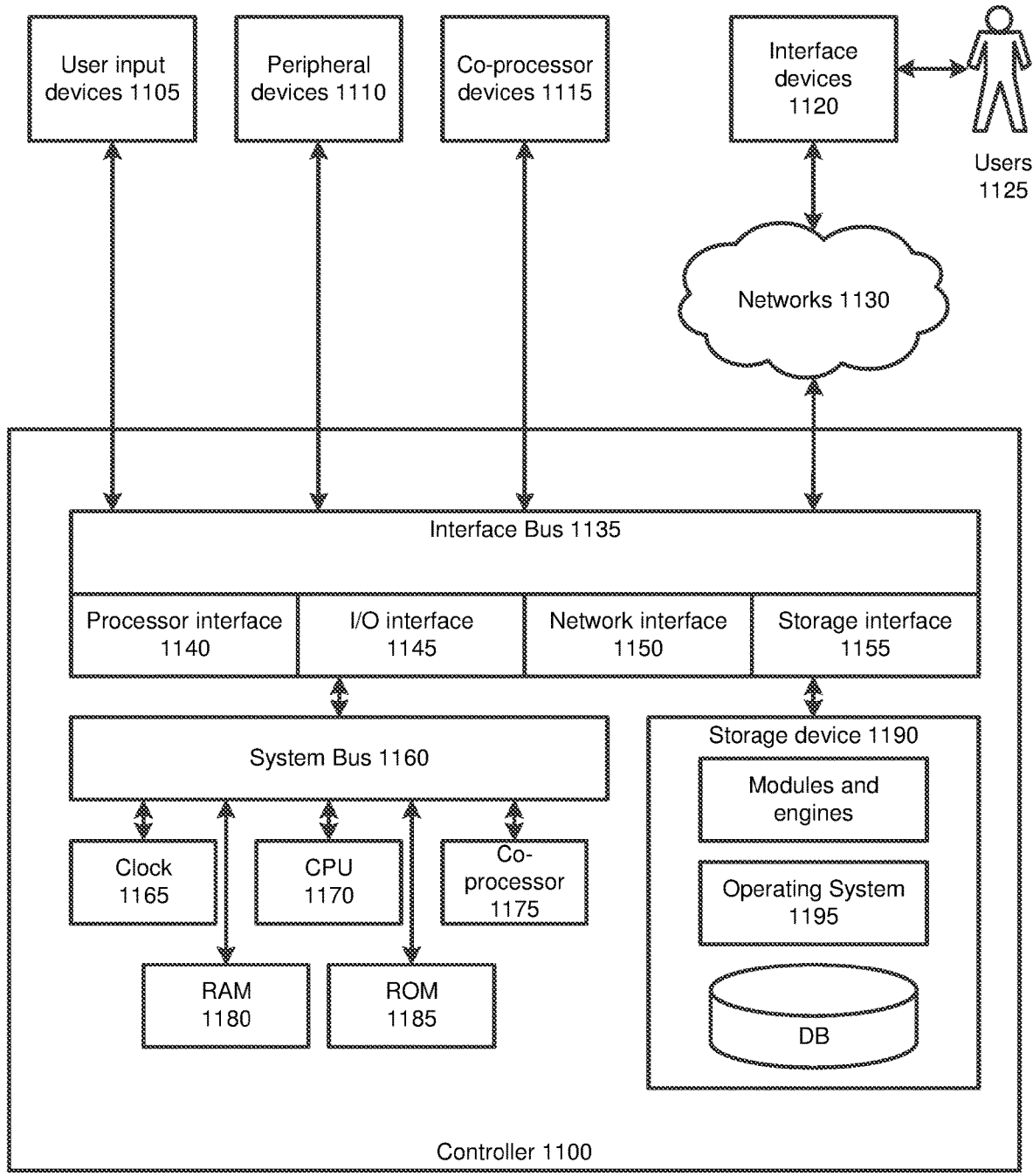
FIG. 11 illustrates an example of a computer systemization that may be used in one or more embodiments of the present technology.

FIG. 11 is a block diagram illustrating an example machine representing the computer systemization of the data analyzer. The controller 1100 may be in communication with entities including one or more users 1125 client/terminal devices 1120, user input devices 1105, peripheral devices 1110, an optional co-processor device(s) (e.g., cryptographic processor devices) 1115, and networks 1130. Users may engage with the controller 1100 via terminal devices 1120 over networks 1130.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 1100 may include clock 1165, CPU 1170, memory such as read only memory (ROM) 1185 and random access memory (RAM) 1180 and co-processor 1175 among others. These controller components may be connected to a system bus 1160, and through the system bus 1160 to an interface bus 1135. Further, user input devices 1105, peripheral devices 1110, co-processor devices 1115, and the like, may be connected through the interface bus 1135 to the system bus 1160. The interface bus 1135 may be connected to a number of interface adapters such as processor interface 1140, input output interfaces (I/O) 1145, network interfaces 1150, storage interfaces 1155, and the like.

Processor interface 1140 may facilitate communication between co-processor devices 1115 and co-processor 1175. In one implementation, processor interface 1140 may expedite encryption and decryption of requests or data. Input output interfaces (I/O) 1145 facilitate communication between user input devices 1105, peripheral devices 1110, co-processor devices 1115, and/or the like and components of the controller 1100 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 1150 may be in communication with the network 1130. Through the network 1130, the controller 1100 may be accessible to remote terminal devices 1120. Network interfaces 1150 may use various wired and wireless connection protocols such as, direct connect, Ethernet, wireless connection such as IEEE 802.11a-x, and the like.

Examples of network 1130 include the Internet, Local Area Network (LAN), Metropolitan Area Network (MAN), a Wide Area Network (WAN), wireless network (e.g., using Wireless Application Protocol WAP), a secured custom connection, and the like. The network interfaces 1150 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 1155 may be in communication with a number of storage devices such as, storage devices 1190, removable disc devices, and the like. The storage interfaces 1155 may use various connection protocols such as Serial Advanced Technology Attachment (SATA), IEEE 1394, Ethernet, Universal Serial Bus (USB), and the like.

User input devices 1105 and peripheral devices 1110 may be connected to I/O interface 1145 and potentially other interfaces, buses and/or components. User input devices 1105 may include card readers, fingerprint readers, joysticks, keyboards, microphones, mouse, remote controls, retina readers, touch screens, sensors, and/or the like. Peripheral devices 1110 may include antenna, audio devices (e.g., microphone, speakers, etc.), cameras, external processors, communication devices, radio frequency identifiers (RFIDs), scanners, printers, storage devices, transceivers, and/or the like. Co-processor devices 1115 may be connected to the controller 1100 through interface bus 1135, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 1100 may employ various forms of memory including on-chip CPU memory (e.g., registers), RAM 1180, ROM 1185, and storage devices 1190. Storage devices 1190 may employ any number of tangible, non-transitory storage devices or systems such as fixed or removable magnetic disk drive, an optical drive, solid state memory devices and other processor-readable storage media. Computer-executable instructions stored in the memory may include the data analyzer 130 having one or more program modules such as routines, programs, objects, components, data structures, and so on that perform particular tasks or implement particular abstract data types. For example, the memory may contain operating system (OS) component 1095, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The controller 1100 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 1100 may be distributed electronically over the Internet or over other networks (including wireless networks). Those skilled in the relevant art(s) will recognize that portions of the data analyzer may reside on a server computer, while corresponding portions reside on a client computer. Data structures and transmission of data particular to aspects of the controller 1100 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A deep brain stimulation system for treating targeted sleep deficits of a neurological, or neurodegenerative, disorder patient experiencing sleep dysfunction, the deep brain stimulation system comprising:
    an implantable electrode array configured to deliver electrical pulses to an area of the brain of the patient; and
    a programmable generator that includes:
        a neural interface management system to control the implantable electrode array;
        a physiological sensing module capable of causing the implantable electrode array to collect local field potential (LFP) signals from the area of the brain of the patient while the patient is sleeping;
        a classifier in operable communication with an artificial neural network (ANN), wherein the ANN is trained to identify, from among a plurality of various sleep states, a particular sleep state of the area of the brain of the patient based on the LFP signals, the ANN is trained by:
            collecting clinical data collected from a plurality of patients during sleeping in a clinical setting, wherein the clinical data comprises LFP data;
            preprocessing the clinical data to generate normalized clinical data;
            labeling a plurality of sleep states within the LFP data using the normalized clinical data to generate labeled LFP data; and
            training the ANN to predict a sleep state based on LFP signals using the labeled LFP data; and
        a physiological stimulation module capable of using the particular sleep state identified by the classifier to generate one or more control signals to cause the implantable electrode array to deliver the electrical pulses to the area of the brain of the patient directed to therapeutically addressing at least one of the targeted sleep deficits.

2. The deep brain stimulation system of claim 1, wherein the artificial neural network is initially trained using a global data set of patient data.

3. The deep brain stimulation system of claim 1, wherein preprocessing the clinical data to generate the normalized clinical data further comprises:
    identifying a maximum peak within the LFP data; and
    normalizing the LFP data by dividing the maximum peak so that all of the LFP data has a maximum amplitude of one.

4. The deep brain stimulation system of claim 1, wherein the artificial neural network has a single hidden layer.

5. The deep brain stimulation system of claim 1, wherein the plurality of various sleep states includes a first sleep state and a second sleep state, and wherein in response to the classifier identifying the first sleep state, the physiological stimulation module causes the implantable electrode array to deliver targeted stimulation to the area of the brain of the patient to improve transition from the first sleep state to the second sleep state.

6. The deep brain stimulation system of claim 1, wherein the classifier is further configured to identify the particular sleep state as awake, rapid eye movement (REM) sleep, or non-REM sleep.

7. The deep brain stimulation system of claim 1, wherein the area of the brain of the patient is the subthalamic nucleus.

8. The deep brain stimulation system of claim 1, wherein the classifier is further configured to utilize the LFP signals to:
    identify the particular sleep state; and
    cause the implantable electrode array to deliver the electrical pulses to the area of the brain of the patient, in real-time to adaptively modulate sleep of the patient.

9. The deep brain stimulation system of claim 1, wherein the classifier is further configured to normalize data representative of the LFP signals before being ingested by the artificial neural network.

10. A method in a deep brain stimulation system (DBS) for treating targeted sleep deficits of a neurological, or neurodegenerative, disorder patient experiencing sleep dysfunction, the method comprising:
    collecting, via an implanted electrode array of the DBS, local field potential (LFP) signals from an area of the brain of the patient;
    accessing, by a classifier of the DBS, an artificial neural network (ANN), wherein the ANN is trained to identify, from among a plurality of various sleep states, a particular sleep state of the brain of the patient corresponding to the LFP signals, wherein the ANN is trained by:

collecting clinical data collected from a plurality of patients during sleeping in a clinical setting, wherein the clinical data comprises LFP data;

preprocessing the clinical data to generate normalized clinical data;

labeling a plurality of sleep states within the LFP data using the normalized clinical data to generate labeled LFP data; and training the ANN to predict a sleep state based on LFP signals using the labeled LFP data;

generating, by a physiological stimulation module of the DBS and based on the particular sleep state identified by classifier, one or more control signals capable of causing the implanted electrode array to deliver electrical pulses to the area of the brain of the patient directed to therapeutically addressing at least one of the targeted sleep deficits; and applying, via the implanted electrode array and according to the one or more control signals, the electrical pulses to the area of the brain of the patient.

11. The method of claim 10, wherein the artificial neural network comprises one or more hidden layers.

12. The method of claim 10, wherein the ANN comprises a deep learning architecture.

13. The method of claim 10, wherein the method further comprises:

collecting a set of training data from one or more sleep studies; and using the set of training data to train the artificial neural network by identifying a set of weights.

14. The method of claim 13, wherein using the set of training data to train the artificial neural network is done remotely from the deep brain stimulation DBS, the method further comprising receiving a firmware update to the DBS that includes the set of weights for the artificial neural network.

15. The method of claim 10, further comprising:

using an external device to collect additional physiological data about the patient;

identifying from the additional physiological data a sleep state of the patient;

labeling the additional physiological data; and generating a local update to the ANN based on the additional physiological data.

16. One or more non-transitory machine readable media having stored thereon instructions that, when executed by at least one processor, cause a deep brain stimulation system to:

collect local field potential (LFP) signals from an area of the brain of a neurological, or neurodegenerative, disorder patient experiencing sleep dysfunction while the patient is sleeping;

access an artificial neural network (ANN) that is trained to identify, from among a plurality of various sleep states, a particular sleep state of the area of the brain of the patient corresponding to the LFP signals, wherein the ANN is trained by:

collecting clinical data collected from a plurality of patients during sleeping in a clinical setting, wherein the clinical data comprises LFP data;

preprocessing the clinical data to generate normalized clinical data;

labeling a plurality of sleep states within the LFP data using the normalized clinical data to generate labeled LFP data; and training the ANN to predict a sleep state based on LFP signals using the labeled LFP data; and generate, based on the particular sleep state identified using the ANN, one or more control signals capable of causing an implanted electrode array to deliver one or more electrical pulses to the area of the brain of the patient directed to therapeutically addressing a targeted sleep deficit of a neurological, or neurodegenerative, disorder patient experiencing sleep.

17. The one or more non-transitory machine readable media of claim 16, wherein the one or more control signals are further capable of causing the implanted electrode array to deliver a plurality of electrical pulses to the area of the brain of the patient, and wherein, when executed by the at least one processor, the instructions further cause the deep brain stimulation system to:

cause the implanted electrode array to deliver at least a first electrical pulse of the plurality of electrical pulses to the area of the brain of the patient;

collect additional physiological data from the brain of the patient after application of the at least a first electrical pulse to the area of the brain of the patient; and dynamically update a characteristic of at least a second pulse of the plurality of electrical pulses directed to therapeutically addressing the targeted sleep deficit.

18. The one or more non-transitory machine readable media of claim 16, wherein, when executed by the at least one processor, the instructions further cause the deep brain stimulation system to transmit data representative of the LFP signals collected from the area of the brain of the patient to a remote computing device that aggregates the data representative of the LFP signals from multiple patients and generates a global model for the artificial neural network.

19. The one or more non-transitory machine readable media of claim 18, wherein, when executed by the at least one processor, the instructions further cause the deep brain stimulation system to:

receive the global model for the artificial neural network from the remote computing device; and refine the global model based on locally collected data.

* * * * *